United States Patent [19]

Platzek et al.

[11] Patent Number: 6,113,880
[45] Date of Patent: Sep. 5, 2000

[54] POLYROTAXANE DERIVATIVES FOR X-RAY AND NUCLEAR MAGNETIC RESONANCE IMAGING

[75] Inventors: Johannes Platzek; Heribert Schmitt-Willich, both of Berlin, Germany

[73] Assignee: Schering Aktiengesellschaft, Germany

[21] Appl. No.: 09/213,287

[22] Filed: Dec. 17, 1998

Related U.S. Application Data

[60] Provisional application No. 60/070,703, Jan. 7, 1998.

[30] Foreign Application Priority Data

Dec. 17, 1997 [DE] Germany ............................ 197 58 118

[51] Int. Cl.$^7$ ............................ A61B 5/055; A61K 49/04
[52] U.S. Cl. .................... 424/9.35; 424/9.36; 424/9.363; 424/9.364; 424/9.42; 424/9.43; 534/16; 536/46; 536/103; 536/121; 514/58; 514/836
[58] Field of Search ................................ 424/9.36, 9.363, 424/9.364, 9.35, 9.43; 534/16; 536/17.1, 46, 103, 121; 514/58, 836; 436/173; 600/420

[56] References Cited

U.S. PATENT DOCUMENTS

| | | | |
|---|---|---|---|
| 4,986,980 | 1/1991 | Jacobsen | 424/9 |
| 5,155,215 | 10/1992 | Ranney | 534/16 |
| 5,250,672 | 10/1993 | Sadler et al. | 536/7.3 |
| 5,281,704 | 1/1994 | Love et al. | 540/465 |
| 5,336,762 | 8/1994 | Ranney | 534/16 |
| 5,364,614 | 11/1994 | Platzek et al. | 424/9 |
| 5,855,900 | 1/1999 | Nobuhiko | 424/425 |

FOREIGN PATENT DOCUMENTS 0766968  4/1997  European Pat. Off. .

OTHER PUBLICATIONS

Harada, A. et al. Nature 364(6437):516–518, (Aug. 1993).

Raymo, F.M. et al. Trends in Polymer Science 4(7): 208–211, (Jul. 1996).

Cardenas, D.J. et al. J. American Chemical Society 119:2656–2664, (1997).

*Primary Examiner*—Gary E. Hollinden
*Attorney, Agent, or Firm*—Millen, White, Zelano, & Branigan, P.C.

[57] ABSTRACT

The invention relates to polyrotaxanes that contain metal complexes or iodine-containing benzene derivatives as imaging components for MRT diagnosis and x-ray diagnosis.

10 Claims, No Drawings

POLYROTAXANE DERIVATIVES FOR X-RAY AND NUCLEAR MAGNETIC RESONANCE IMAGING

Priority under 35 U.S.C. §119 is claimed of United States Provisional Application Ser. No. 60/070,703, filed Jan. 7, 1998.

The invention relates to the object that is characterized in the claims, i.e., new polyrotaxanes, agents that contain these compounds, the use of these compounds in diagnosis, as well as a process for the production of these compounds and agents.

Polyrotaxanes are compounds in which several ring-shaped molecules are strung on a suitable polymer backbone. Such high-molecular molecule structures are described by, i.a., A. Harada et al., J. Am. Chem. Soc. 1994, 116, 3192–96 and G. Wenz et al., Angew. Chem. (Applied Chemistry) 104, 201–204 (1992).

The contrast media that are currently used in clinical practice for the modern imaging processes nuclear spin tomography (MRI) and computer tomography (CT) [Magnevist$^{(R)}$, Pro Hance$^{(R)}$, Ultravist$^{(R)}$ and Omniscan$^{(R)}$], are dispersed throughout the entire extracellular space of the body (intravascular space and interstice). This dispersion space comprises about 20% of the body volume.

Clinically, extracellular MRI contrast media were first used successfully in the diagnosis of cerebral and spinal disease processes since here a quite special situation arises with respect to the regional dispersion space. In the brain and the spinal cord, extracellular contrast media in the healthy tissue cannot leave the intravascular space owing to the blood-brain barrier. In the case of pathological processes with disruption of the blood-brain barrier (e.g., malignant tumors, inflammations, demyelinating diseases, etc.), regions develop inside the brain with increased blood-vessel-permeability to these extracellular contrast media (Schmiedl et al., MRI of Blood-Brain Barrier Permeability in Astrocytic Gliomas: Application of Small and Large Molecular Weight Contrast Media, Magn. Reson. Med. 22: 288, 1991). By exploiting this disruption of vascular permeability, diseased tissue can be detected compared to healthy tissue with high contrast.

Outside of the brain and the spinal cord, however, there is no such permeability barrier to the above-mentioned contrast media (Canty et al., First-Pass Entry of Nonionic Contrast Agent into the Myocardial Extravascular Space. Effects on Radiographic Estimate of Transit Time and Blood Volume. Circulation 84: 2071, 1991). Thus, the concentration of the contrast medium no longer depends on vascular permeability, but rather only on the size of the extracellular space in the corresponding tissue. Delimitation of the vessels compared to the surrounding interstitial space using this contrast medium is not possible.

Especially for visualizing vessels, a contrast medium that disperses only into vascular space would be desirable. Such a blood-pool agent should make it possible, with the aid of nuclear spin tomography, to delimit tissue that is well supplied with blood from tissue that is poorly supplied with blood and thus to diagnose an ischemia. It is also possible to delimit infarcted tissue, owing to its anemia, from surrounding healthy or ischemic tissue when a vascular contrast medium is used. This is of special importance if, e.g., the point is to distinguish a myocardial infarction from an ischemia.

To date, most patients in whom cardiovascular disease is suspected (this disease is the number-one cause of death in the Western industrialized countries) have to undergo invasive diagnostic studies.

There is therefore a need for NMR and x-ray contrast media that can label the vascular space (blood-pool-agent). These compounds are to be distinguished by good compatibility and high effectiveness (large increase in signal intensity in MRI).

To date, the attempt to solve at least a portion of this problem by using complexes that are bonded to macromolecules or biomolecules has been successful to an only very limited extent.

Thus, for example, the number of paramagnetic centers in the complexes, which are described in European Patent Applications No. 0 088 695 and No. 0 150 844, is not sufficient to ensure satisfactory imaging.

If the number of metal ions required is increased by repeatedly introducing complexing units into a macromolecular biomolecule, this is associated with an intolerable impairment of the affinity and/or specificity of this biomolecule [J. Nucl. Med. 24, 1158 (1983)].

Macromolecules can generally be suitable as contrast media for angiography. 24 hours after intravenous injection in rats, however, albumin-GdDTPA (Radiology 1987; 162: 205), e.g., shows a concentration in the liver tissue that amounts to almost 30% of the dose. In addition, only 20% of the dose is eliminated within 24 hours.

The macromolecule polylysine-GdDTPA (European Patent Application, Publication No. 0 233 619) also proved suitable as a blood-pool agent. For production-related reasons, however, this compound consists of a mixture of molecules of different sizes. During excretion tests in rats, it was shown that this macromolecule is excreted through the kidney unchanged by glomerular filtration. For synthesis-related reasons, however, polylysine-GdDTPA can also contain macromolecules that are so large that they cannot pass through the capillaries of the kidneys during glomerular filtration and thus remain in the body.

Macromolecular contrast media based on carbohydrates, e.g., dextran, have also been described (European Patent Application, Publication No. 0 326 226). The drawback of these compounds lies in the fact that the latter generally carry only about 5% of the signal-enhancing paramagnetic cation.

The object was therefore to make available new diagnostic agents mainly for detecting and locating vascular diseases, which do not have the above-mentioned drawbacks. This object is achieved by this invention.

The polyrotaxanes according to the invention can be described by general formula I

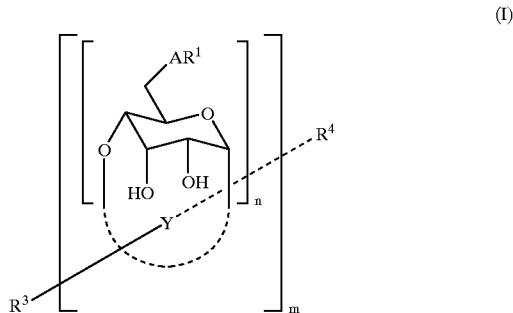

in which
n means the numbers 6, 7 or 8,
m means the numbers 2 to 50,
A means an oxygen atom or the group —XNH—, in which X means a direct bond or the radical —O—(CO$_x$—CHR—(CH$_2$)$_y$— with
x meaning numbers 0 or 1 and
y meaning numbers 0 to 10, R$^1$ means opacifying radicals II, III, IV, V, VI, VII, VIII, IX or X

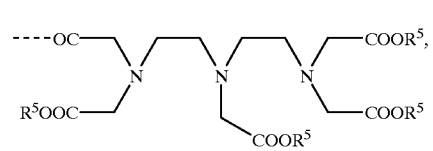
(II)

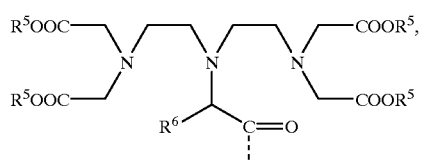
(III)

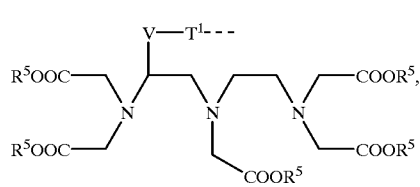
(IV)

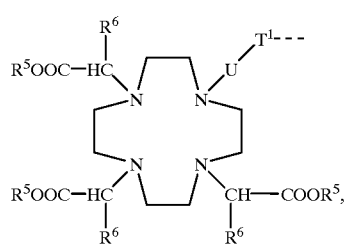
(V)

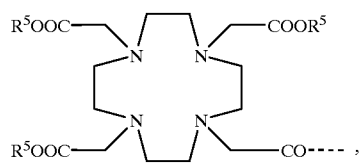
(VI)

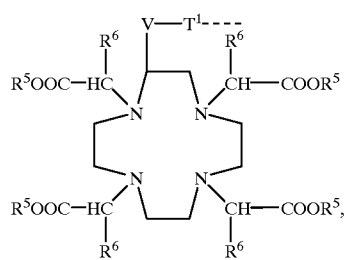
(VII)

in which

R$^5$, independently of one another, mean a hydrogen atom or a metal ion equivalent of the elements of atomic numbers 20–32, 37–39, 42–44, 49 or 57–83, R$^6$ means a hydrogen atom, a straight-chain or branched C$_1$–C$_7$ alkyl radical, a phenyl or benzyl radical,

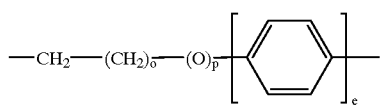

o meaning numbers 0 to 10,
p and e in each case meaning the numbers 0 or 1, provided that p only stands for number 1 if e means number 1,
T$^1$ means an —NHCS or —CO group,
U means a —CHR$^7$—CONR$^7$—M$^1$ or —CH$_2$—CH(OH)—M$^2$ group with R$^7$ and R$^{7'}$, independently of one another, meaning R$^6$ or the group —CH$_2$—(CH$_2$)$_o$—COOH and M$^1$ and M$^2$ in each case meaning a phenylene radical or a straight-chain, branched, saturated or unsaturated C$_1$–C$_{20}$ alkylene chain, which optionally is substituted by 1–5 (CH$_2$)$_o$—COOH, 1–5 OR$^6$ radicals or 1–8 oxygen atoms, 1–2 —NH, 1–2 —C(=NH), 1–5 —CONR$^7$, 1–5 —NR$^7$CO, 1–2 phenylene or 1–2 phenylenoxy groups, provided that at least two of radicals R$^5$ stand for metal ion equivalents of the elements of the above-mentioned atomic numbers and optionally cations of inorganic and/or organic bases, amino acids or amino acid amides,

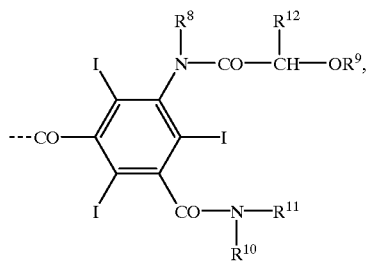
(VIII)

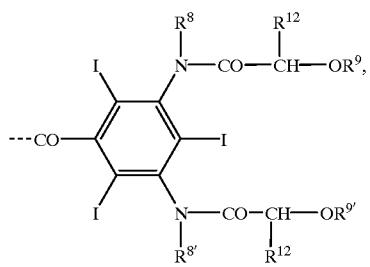
(IX)

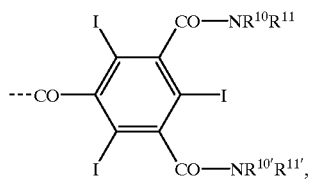
(X)

with
R$^1$, R$^{8'}$, R$^{10}$, R$^{10'}$, R$^{11}$, R$^{11'}$, which can be the same or different, meaning hydrogen or straight-chain alkyl with 2–6 C atoms or branched-chain alkyl with 3–6 C atoms, whereby both alkyl radicals can be substituted with 1–5 OH groups,
R$^9$, R$^{9'}$, R$^{12}$, which can be the same or different, meaning hydrogen or methyl and
Y means the radicals —W—(CH$_2$)$_2$[O—CH$_2$—CH$_2$]$_q$—W,

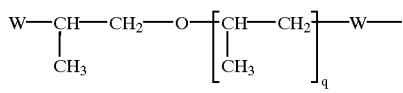

in which q means the numbers 8 to 200, W means the NH group or the O atom, and $R^3$ and $R^4$, independently of one another, mean a substituent with a diameter of at least 0.6 nm.

As preferred substituents for $R^6$ and $R^7$ or $R^{7'}$, the hydrogen atom and the methyl group can be mentioned. As preferred substituents of $R^8$, $R^{8'}$, $R^{10}$, $R^{10'}$, $R^{11}$ and $R^{11'}$, hydrogen, the methyl group and straight-chain or branched alkyl groups with up to 6 C atoms, which can be substituted by 1–5 hydroxy groups, can be mentioned. As examples of the latter, there can be cited:

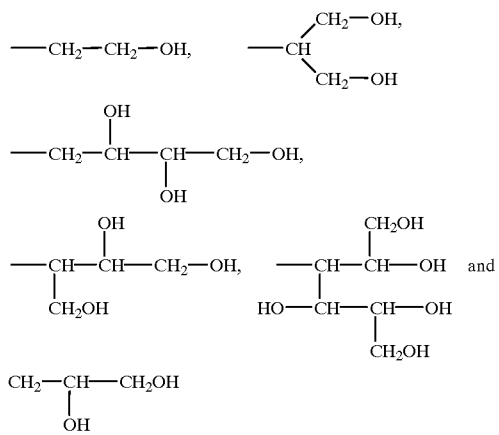

For q, the preferred range is 15–80.

For w, the preferred range is 5–30.

As preferred groups that stand for V, the $CH_2C_6H_4$, $CH_2-O-C_6H_4$, $(CH_2)_4$, $(CH_2)_6$ and $(CH_2)_{10}$ groups can be mentioned by way of example, whereby the $C_6H_4$ group is bonded to $T^1$.

Preferred substituents for $R^7$ are the hydrogen atom, the methyl, $CH_2COOH$ and $(CH_2)_2COOH$ groups.

As groups $M^1$, there can be mentioned by way of example

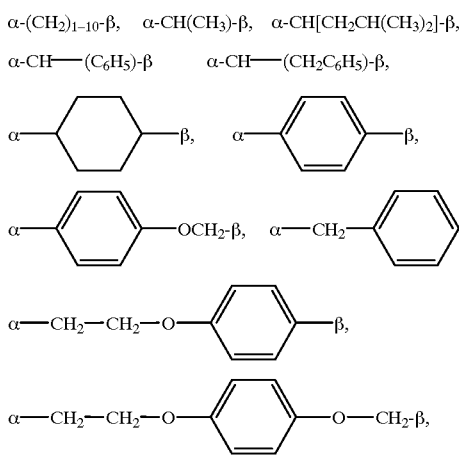

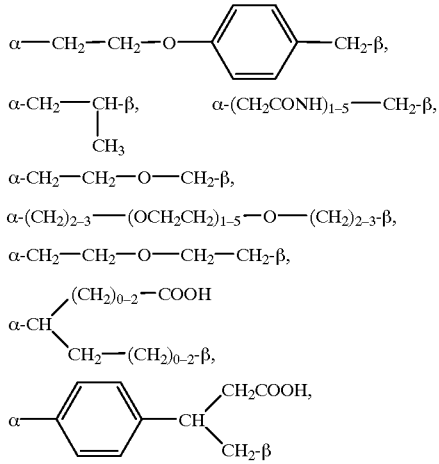

whereby α indicates the interface site to radical $CONR^7$ and β indicates the interface site to $T^1$.

Preferred are the groups:

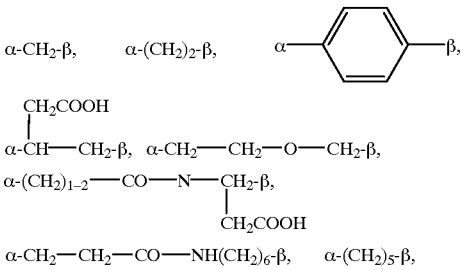

As groups $M^2$, there can be mentioned by way of example:

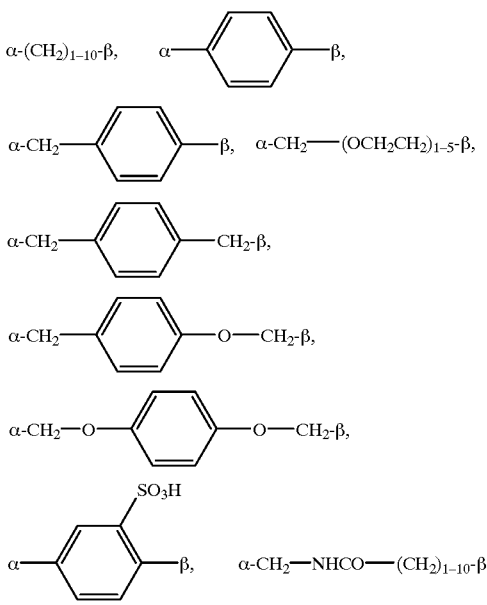

whereby α indicates the interface site to radical —CH(OH)— and β indicates the interface site to $T^1$.

Preferred are the groups:
α-CH₂-β,
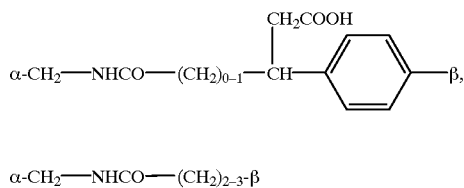
α-CH₂—NHCO—(CH₂)₂₋₃-β
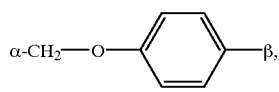
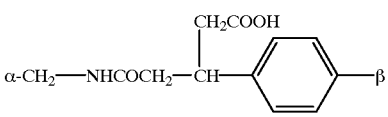
Especially preferred is the group:
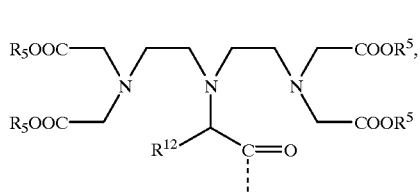
As preferred radicals $R^1$ or $R^3$ and $R^4$, opacifying radicals II, IIIa, V—especially Va, Vb, Vc and Vd—, VIIIa and VIIIb can be mentioned:
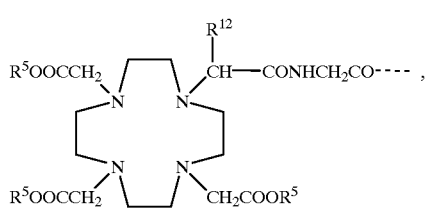
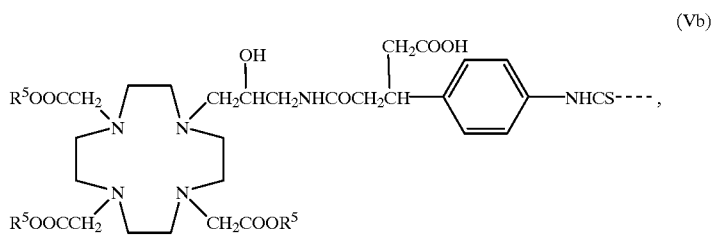
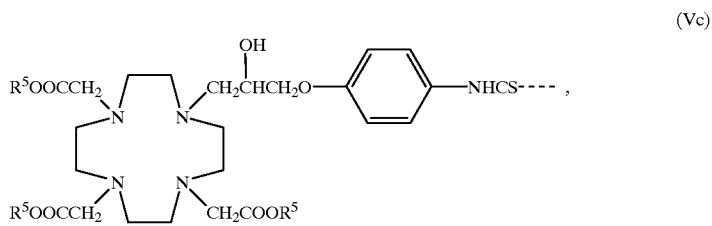
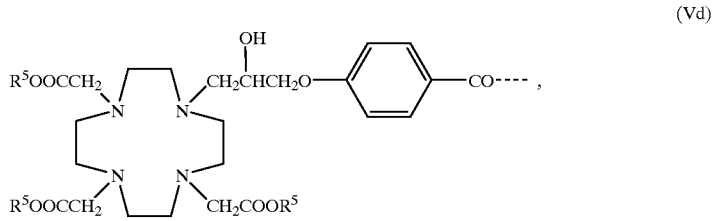

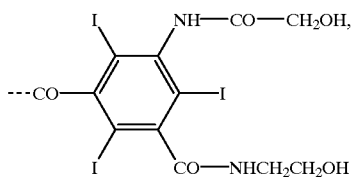
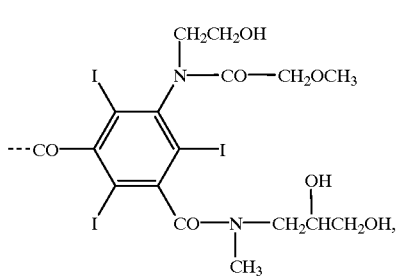
As additional preferred radicals for $R^3$ and $R^4$, the radicals of general formula
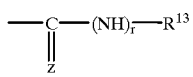
with Z meaning an oxygen atom or sulfur atom, and r meaning the numbers 0 or 1, especially
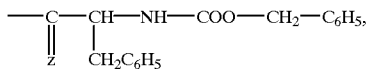
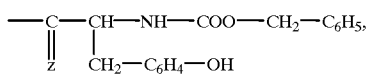
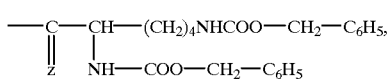
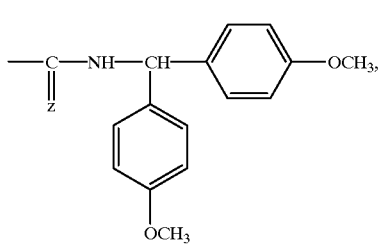
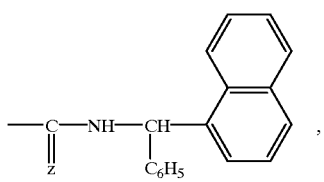
(VIIIa)
(VIIIb)
-continued
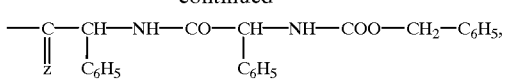
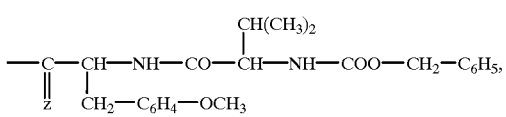
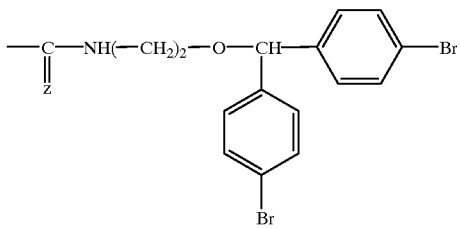
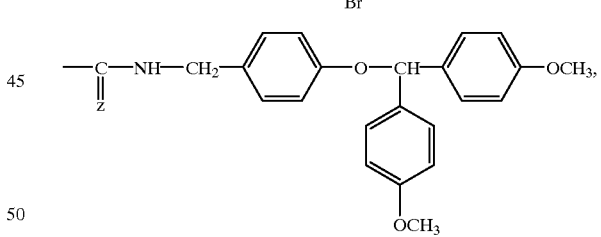
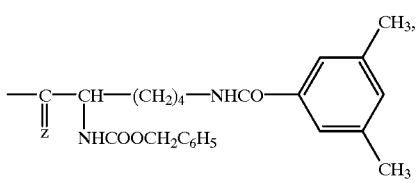
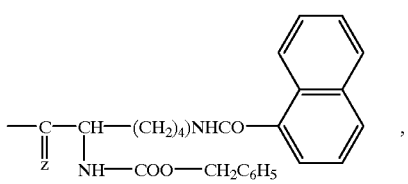

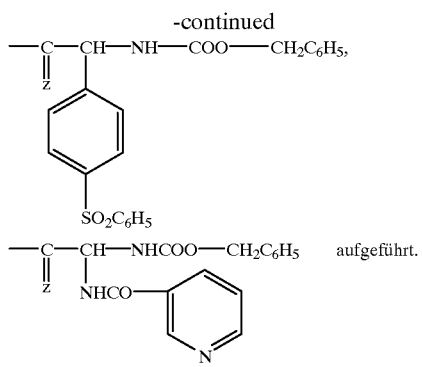

can be cited.

If the agent according to the invention is intended for use in NMR diagnosis, the central ion of the complex salt has to be paramagnetic. These are especially the divalent and trivalent ions of the elements of atomic numbers 21–29, 42, 44 and 58–70. Suitable ions are, for example, the chromium (III), iron(II), cobalt(II), nickel(II), copper(II), praseodymium(III), neodymium(III), samarium(III) and ytterbium(III) ions. Because of their very strong magnetic moment, the gadolinium(III), terbium(III), dysprosium(III), holmium(III), erbium(III), manganese(II) and iron(III) ions are especially preferred.

If the compound according to the invention is intended for use in x-ray diagnosis, the metal ion is preferably derived from an element of a higher atomic number to achieve sufficient absorption of x rays. It has been found that diagnostic agents that contain a physiologically compatible complex salt with metal ions of elements of atomic numbers 25 and 26 as well as 57–83 are suitable for this purpose.

Preferred are manganese(II), iron(II), iron(III), praseodymium(III), neodymium(III), samarium(III), gadolinium(III), ytterbium(III) or bismuth(III) ions, especially dysprosium(III) ions.

The polyrotaxane complexes according to the invention contain at least 12 ions of an element of the above-mentioned atomic number.

The residual acid hydrogen atoms, i.e., those that have not been substituted by the central ion, can optionally be replaced completely or partially by cations of inorganic and/or organic bases, amino acids or amino acid amides.

Suitable inorganic cations are, for example, the lithium ion, the potassium ion, the calcium ion, the magnesium ion and especially the sodium ion. Suitable cations of organic bases are, i.a., those of primary, secondary or tertiary amines, such as, for example, ethanolamine, diethanolamine, morpholine, glucamine, N,N-dimethylglucamine and especially N-methylglucamine. Suitable cations of amino acids are, for example, those of lysine, arginine and ornithine as well as the amides of otherwise acidic or neutral amino acids.

The compounds according to the invention, which have a molecular weight of 10,000–200,000, preferably 20,000–80,000 Da, exhibit the above-mentioned desired properties. They contain the large number of metal ions, bonded in a stable manner in the complex, that are required for their use.

The new polyrotaxanes build up in regions with elevated vascular permeability, such as, e.g., in tumors, make it possible to make statements on the perfusion of tissues, provide the opportunity to determine the blood volume in tissues, to shorten the relaxation times or densities of the blood in a selective manner, and to display graphically the permeability of the blood vessels. Such physiological information cannot be obtained by using extracellular contrast media, such as, e.g., Gd-DTPA [Magnevist$^{(R)}$]. From these standpoints also emerge the uses in the modern imaging processes of nuclear spin tomography and computer tomography: more specific diagnoses of malignant tumors, early therapy monitoring in the case of cytostatic, antiphlogistic or vasodilatative therapy, early detection of underperfused regions (e.g., in the myocardium), angiography in vascular diseases, and detection and diagnosis of (sterile or infectious) diseases. In addition, the polyrotaxane complexes according to the invention are extremely well suited for displaying the lymphatic vessels (interstitial and intravenous lymphography).

As further advantages over extracellular contrast media, such as, e.g., Gd-DTPA [Magnevist$^{(R)}$], the elevated effectiveness as contrast media for nuclear spin tomography (elevated relaxivity) has to be emphasized, which leads to a significant reduction of the diagnostically necessary dose. At the same time, the contrast media according to the invention can be formulated as solutions in an isoosmolar manner with regard to the blood, and thus reduce the osmotic burdening of the body, which is reflected in a reduced toxicity of the substance (higher toxic threshold). Lower doses, and higher toxic thresholds result in a significant increase of the reliability of contrast medium uses in modern imaging processes.

Compared to other macromolecular contrast media based on carbohydrates, e.g., dextran (European Patent Application, Publication No. 0 326 226), which—as mentioned—generally carry only about 5% of the signal-enhancing paramagnetic cation, the polyrotaxane complexes according to the invention have a content of generally about 10–20% of the paramagnetic cation. Thus, the macromolecules according to the invention produce per molecule a very much higher signal enhancement, which at the same time leads to the fact that the dose that is necessary for nuclear spin tomography is considerably smaller.

It has been possible with the polyrotaxane complexes according to the invention to make available high-molecular contrast media, which, surprisingly enough, are completely eliminated, although the average molecular weight, in some cases, is considerably above the kidney filtration threshold.

Compared to the other mentioned polymer compounds of the prior art, the complexes according to the invention are distinguished by improved excretion behavior, greater effectiveness, greater stability and/or better compatibility.

Another advantage of this invention lies in the fact that now complexes with hydrophilic or lipophilic, macrocyclic or open-chain, low-molecular or high-molecular ligands have become accessible. In addition, the opportunity is provided to control compatibility and pharmacokinetics of these polymer complexes by chemical substitution.

The production of the polyrotaxane complexes according to the invention is carried out in that compounds of general formula II, (II)

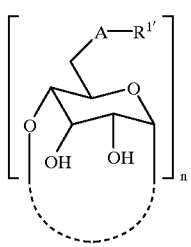

in which

A and n have the above-indicated meanings and

R$^{1'}$ stands for a hydrogen atom or the radical II', III', IV', V', VI', VII', VIII', IX' or X', in which the latter have the meaning that is indicated for II-X, but radicals R$^5$ that are present in them stand for hydrogen or acid protective groups and optionally present hydroxy groups are optionally present in protected form, are reacted with compounds of general formula XI

H—Y—H to compounds of general formula XII (XII)

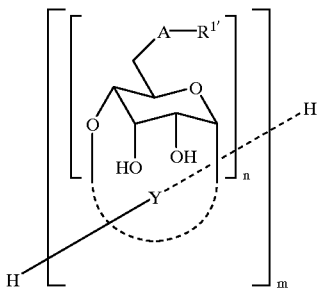

and the latter are reacted with a compound R$^{3'}$-Fg and/or R$^{4'}$-Fg, in which R$^{3'}$ and R$^{4'}$ have the meaning that is indicated for R$^3$ and R$^4$, but radical R$^5$ that is in R$^1$ stands for hydrogen, acid protective groups or a metal ion equivalent of the elements of the above-mentioned atomic numbers and Fg stands for anhydride,

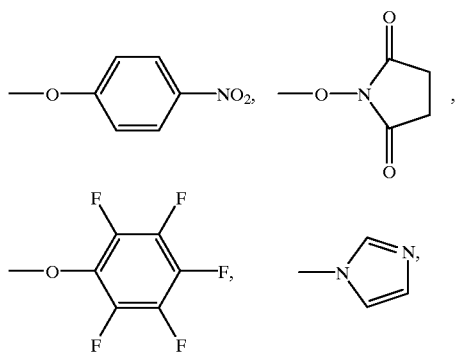

-continued

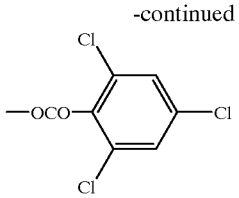

whereby if R$^3$ and/or R$^4$ in (I) stand for a radical

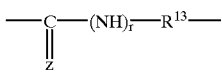

a compound of general formula R$^3$—N═C═Z and/or R$^4$—N═C═Z is used, and if T$^1$ stands for an NHCS group in IV, V and VII, a compound of general formula IV", V" or VI'

(IV")

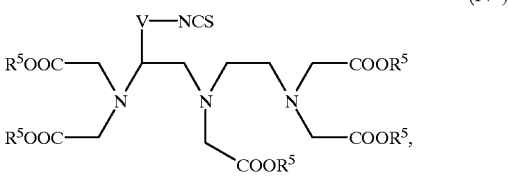

(V")

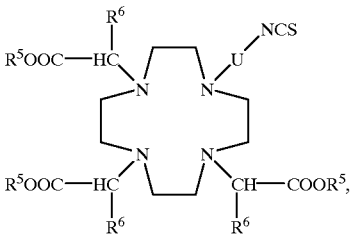

(VII")

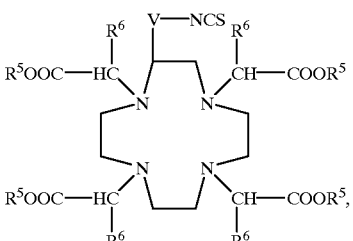

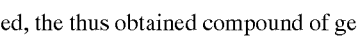

is used, the thus obtained compound of general formula XIII (XIII)

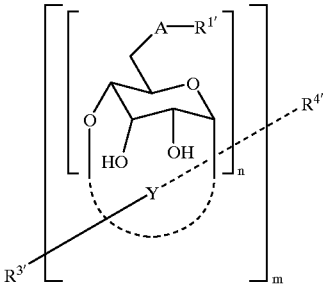

if R$^{1'}$ has the meaning of hydrogen, is reacted with a compound R$^{1''}$-Fg, in which R$^{1''}$ has the meaning indicated for $R^1$, but radicals $R^5$ that are present in them stand for hydrogen, acid protective groups or a metal ion equivalent of the elements of the above-mentioned atomic numbers, or is reacted with compounds of IV", V" or VII" and then, if $R^5$ in XIII does not stand for the above-mentioned metal ion equivalents, optionally present acid protective groups are cleaved off, the desired metal ions are introduced and then, if desired, existing acid hydrogen atoms are substituted by cations of inorganic and/or organic bases, amino acids or amino acid amides.

The production of the pseudopolyrotaxanes of general formula XII is carried out according to methods that are known in the literature (e.g., A. Harada et al., J. Am. Chem. Soc. 1994, 116, 3192–96; A. Harada et al., Nature, 370, 126–128 (1994); Y.-M. Jeon et al., Chemistry Letters 1996, 503–504), by the thread-shaped molecule of general formula XI being reacted in a polar solvent, such as, e.g., water, DMSO, formamide as well as their mixtures, preferably water, at temperatures of between 10 and 100° C., preferably at room temperature, optionally in an ultrasonic bath, optionally with the addition of inorganic salts, such as, e.g., sodium chloride, potassium chloride, sodium bromide, with the desired cyclodextrin of general formula II.

The following conversion of the pseudopolyrotaxanes into the desired polyrotaxanes of general formula XIII is carried out, as also described in the examples, according to methods that are known in the literature (H. W. Gibson et al., Adv. Mater. 1993, 5, 11–21; H. W. Gibson et al., J. Org. Chem. 1993, 58, 3748–56; H. W. Gibson et al., J. Am. Chem. Soc. 1995, 117, 852–874; D. B. Amabilino et al., Am. Chem. Soc. 1996, 118, 12,012–20; I. Yamaguchi et al., Am. Chem. Soc. 1996, 118, 1811–12), by reaction with compounds of general formula $R^{3'}$-Fg and/or $R^{4'}$-Fg or with compounds of general formula $R^3$—N=C=Z and/or $R^4$—N=C=Z or with compounds of general formula IV", V" or VII", preferably in polar solvents, such as, e.g., DMSO, DMF, water or their mixtures at temperatures of between 0 and 100° C., preferably 10 to 30° C., optionally with the addition of adjuvants that are known to one skilled in the art for ester formation (Houben Weyl, Methoden der organischen Chemie [Methods of Organic Chemistry], 1985, Vol. E5, pp. 656–772; Comprehensive organic Transformations, Richard Larock, 1989 VCH Publishers, Inc., pp. 966–972), Amide Coupling (Houben Weyl, Methoden der organischen Chemie, 1974, Vol. 15/2, pp. 1–395; Houben Weyl, Methoden der organischen Chemie, 1985, Vol. E5, pp. 934–1116; Comprehensive Organic Transformations, Richard Larock, 1989 VCH Publishers Inc. pp. 972–976, Fournic-Zaluski et al., J. Med. Chem. 1996, 39, 2596; Y. M. Angell et al., Tetrahedron Letters 1994, 35, 5981; L. A. Carpino et al., J. Chem. Soc. Commun. 1994, 201; H-O. Kim et al., Tetrahedron Letters 1995, 36, 6013; D. Papaioannou et al., Tetrahedron Letters, 1995, 36, 5187, G. Stemple et al., Bioorg. Med. Letters 1996, 6, 55), thiocyanate formation (The Chemistry of Cyanates and their Thio Derivatives, Part 2, pp. 1003–1223, Saul Patai, 1977, John Wiley and Sons; Chem. Soc. Rev. 4, 231–250 (1975) and Carbamate Formation (The Chemistry of Cyanates and their Thio Derivatives, Part 2, pp. 620–792, Saul Patai, 1977, John Wiley and Sons). If the polyrotaxanes of general formula XIII that are thus synthesized in the cyclodextrin portion still do not contain any complexes or complexing agents (i.e., if $R^{1'}$=H), the latter are reacted under the conditions that are indicated above for the production of polyrotaxanes from the pseudopolyrotaxanes with compounds of general formula $R^{1''}$-Fg or with compounds of general formula IV", V" or VII".

If the radicals that are contained in $R^1$ still do not contain any metal ions of the elements of the above-mentioned atomic numbers, the latter are introduced according to methods known to one skilled in the art (e.g., EP 071564) after cleavage of optionally present acid protective groups.

If radicals $R^3$ and/or $R^4$ stand for a radical meaning $R^1$, opacifying radicals II-X can, if substituent $R^{1'}$ stands for hydrogen in the educt of general formula XII, be introduced simultaneously into the molecule optionally in a single-pot reaction.

The educts of general formula II with $R^{1'}$ meaning hydrogen are commercially available products or are known in the literature, see, e.g., J. Boger et al., Helv. Chim. Acta 61, 2190 (1978); Peter R. Ashton et al., J. Org. Chem. 1996, 61, 903–908.

The compounds of general formula II with $R^{1'}$ meaning radicals II'-X' are known in the literature or can be obtained analogously to methods that are known in the literature:

IV": see, e.g., WO 91/14459,

V": see, e.g., U.S. Pat. No. 5,053,503, WO 96/02669, WO 96/01655, EP 0430863, EP 255471, U.S. Pat. No. 5,277,895, EP 0232751, U.S. Pat. No. 4,885,363, VII": see, e.g., U.S. Pat. No. 4,923,985.

The compounds of general formula $R^{1''}$-Fg, i.e., compounds of general formula IIA-XA

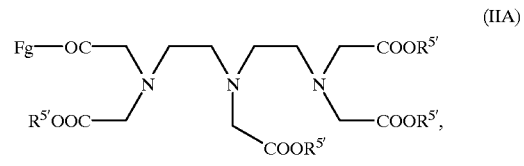
(IIA)

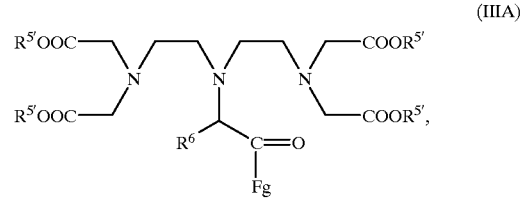
(IIIA)

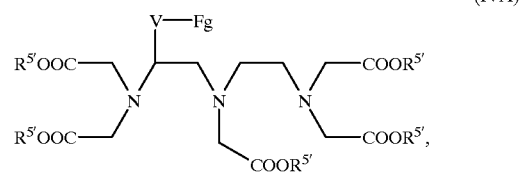
(IVA)

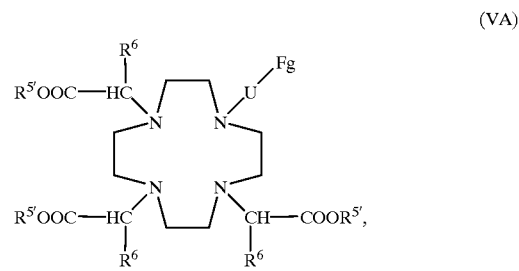
(VA)

-continued

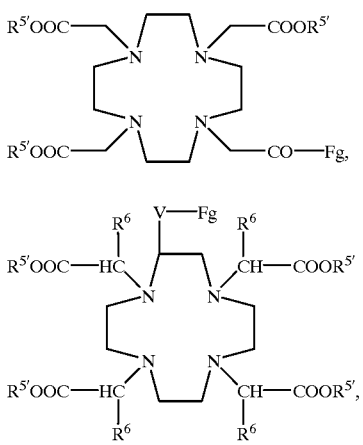

(VIA)

(VIIA)

in which
R⁵' stands for R⁵ or an acid protective group,

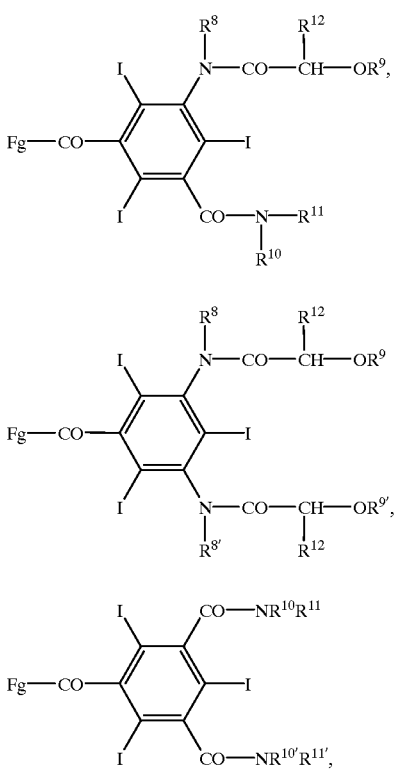

(VIIIA)

(IXA)

(XA)

are known in the literature or can be obtained analogously to methods that are known in the literature:

IIA: see, e.g., EP 263059
IIIA: see, e.g., DE 19507822, DE 19580858, DE 19507819
IVA: see, e.g., WO 91/14459
VA: see, e.g., U.S. Pat. No. 5,053,503, WO 96/02669, WO 96/01655, EP 0430863, EP 255471, U.S. Pat. No. 5,277,895, EP 0232751, U.S. Pat. No. 4,885,363
VIA: see, e.g., EP 0255471
VIIA: see, e.g., U.S. Pat. No. 4,923,985
VIIIA: see, e.g., DE 2207950
IXA: see, e.g., U.S. Pat. No. 3,702,866
XA: see, e.g., EP 0032388

The thread-shaped compounds of formula XI are commercially available, for example, in the companies of Shearwater Polymers, Inc., USA, Sigma, Aldrich, and Fluka.

The purification of the polyrotaxane complexes that are obtained is carried out optionally after the pH is set at 6 to 8, preferably about 7, by adding an acid or a base, preferably by ultrafiltration with membranes of suitable pore size (e.g., Amicon$^{(R)}$ XM30, Amicon$^{(R)}$ YM10, Amicon$^{(R)}$ YM3) or gel filtration on, e.g., suitable Sephadex$^{(R)}$ gels.

The production of the pharmaceutical agents according to the invention is also carried out in a way known in the art by the complex compounds according to the invention—optionally with the addition of additives that are commonly used in galenicals—being suspended or dissolved in aqueous medium, and then the suspension or solution optionally being sterilized. Suitable additives are, for example, physiologically harmless buffers (such as, for example, tromethamine), additions of complexing agents or weak complexes (such as, for example, diethylenetriaminepentaacetic acid or the corresponding calcium-polyrotaxane complexes) or—if necessary—electrolytes such as, for example, sodium chloride or—if necessary—antioxidants such as, for example, ascorbic acid.

If suspensions or solutions of the agents according to the invention in water or physiological salt solution are desired for enteral administration or other purposes, they are mixed with one or more adjuvant(s) that are commonly used in galenicals (for example, methyl cellulose, lactose, mannitol] and/or surfactant(s) [for example, lecithins, Tween$^{(R)}$, Myrj $^{(R)}$] and/or flavoring substance(s) for taste correction [for example, ethereal oils].

The pharmaceutical agents according to the invention preferably contain 1 μmol–1 mol/l of complex salt and are generally dosed in amounts of 0.0001–5 mmol/kg. They are intended for enteral and parenteral administration. The complex compounds according to the invention are used for NMR diagnosis and x-ray diagnosis in the form of their complexes with the ions of the elements with atomic numbers 21–29, 39, 42, 44 and 57–83.

The agents according to the invention meet the varied requirements for suitability as contrast media for nuclear spin tomography. They are thus extremely well suited in this regard to improve in its informational value the image that is obtained with the aid of nuclear spin tomographs after enteral or parenteral administration by increasing signal intensity. They also show the high effectiveness that is necessary to load the body with the lowest possible amounts of foreign substances and the good compatibility that is necessary to maintain the noninvasive character of the studies.

The good water-solubility and low osmolality of the agents according to the invention make it possible to produce highly-concentrated solutions so that the volume burden of the circulatory system is kept within reasonable limits and the dilution by bodily fluid is compensated for, i.e., NMR diagnostic agents have to be 100- to 1000-fold more water-soluble than those for NMR spectroscopy. In addition, the agents according to the invention have not only high in-vitro stability, but also surprisingly high in-vivo stability, so that a release or an exchange of the ions—toxic in themselves—that are not covalently bonded to the complexes is carried out only extremely slowly within the time in which the new contrast media are completely excreted again.

In general, the agents according to the invention are dosed for use as NMR diagnostic agents in amounts of 0.001–5 mmol/kg, preferably 0.005–0.5 mmol/kg. Details of use are discussed in, for example, H.-J. Weinmann et al., Am. J. of Roentgenology 142, 619 (1984).

Especially low dosages (below 1 mg/kg of body weight) of organ-specific NMR diagnostic agents can be used, for example, for detecting tumors and myocardial infarctions.

The complex compounds according to the invention can also be used advantageously as susceptibility reagents and as shift reagents for in-vivo NMR spectroscopy.

In the in-vivo administration of the therapeutic agents according to the invention, the latter can be administered together with a suitable vehicle, such as, for example, serum or physiological common salt solution, and together with another protein, such as, for example, human serum albumin. In this case, the dosage depends on the type of cellular disorder, the metal ion used and the type of imaging method.

The therapeutic agents according to the invention are administered parenterally, preferably i.v.

In general, the agents according to the invention are dosed for use as x-ray contrast media analogously to, e.g., meglumine-diatrizoate in amounts of 0.1–5 mmol/kg, preferably 0.25–1 mmol/kg.

Details of use of x-ray contrast media are discussed in, for example, Barke, Röntgenkontrastmittal [X-Ray Contrast Media], G. Thieme, Leipzig (1970) and P. Thurn, E. Bücheler "Einführung in die Röntgendiagnostik [Introduction to X-Ray Diagnosis]," G.

Thieme, Stuttgart, N.Y. (1977).

In general, it has been possible to synthesize new metal complex-containing and iodine-containing polyrotaxanes, which open up new possibilities in diagnosis.

The following examples are used for a more detailed explanation of the object of the invention:

In the text, the following abbreviations are used:

Gadolinium-GlyMeDOTA acid: Gadolinium complex of 10-[4-carboxy-1-methyl-2-oxo-3-azabutyl]-1,4,7,10-tetraazacyclododecane-1,4,7-triacetic acid DTPA(t-butyl)$_4$-monocarboxylic acid: 3,9-Bis-(tert-butoxycarbonylmethyl)-6-carboxymethyl-3,6,9-triazaundecane-di-tert-butyl ester

EXAMPLE 1 a) N-(2-Bromopropionyl)-glycine benzyl ester 60.97 g (355.7 mmol) of α-bromopropionyl chloride is added in drops at 0° C. to 100 g (296.4 mmol) of glycine benzyl ester p-toluenesulfonic acid salt and 89.98 g (889.2 mmol) of triethylamine in 500 ml of methylene chloride. In this case, the temperature is kept between 0° C.–5° C. 1000 ml of 5% aqueous hydrochloric acid is added, and the organic phase is separated. The organic phase is extracted once more with 500 ml of 5% aqueous hydrochloric acid, dried on magnesium sulfate and evaporated to the dry state in a vacuum. The residue is recrystallized from diisopropyl ether.

Yield: 69.39 g (78% of theory) Elementary analysis: Cld: C 48.02 H 4.70 N 4.67 Br 26.62 Fnd: C 47.91 H 4.82 N 4.51 Br 26.47 b) 1-[4-Benzyloxycarbonyl)-1-methyl-2-oxo-3-azabutyl]-1,4,7,10-tetraazacyclododecane 50 g (166.6 mmol) of the title compound of Example 1a is added to 86.14 g (500 mmol) of 1,4,7,10-tetraazacyclododecane, dissolved in 1000 ml of chloroform, and it is stirred for 24 hours at room temperature. It is extracted 3 times with 600 ml of water, the organic phase is dried on magnesium sulfate and evaporated to the dry state in a vacuum.

Yield: 53.48 g (82% of theory) of a light yellow-colored oil Water content: 1.5% Elementary analysis (relative to anhydrous substance): Cld: C 61.36 H 8.50 N 17.89 Fnd: C 62.03 H 8.75 N 17.36 c) 10-[4-Benzyloxycarbonyl)-1-methyl-2-oxo-3-azabutyl]-1,4,7,10-tetraazacyclododecane-1,4,7-triacetic acid-tri-tert-butyl ester, sodium bromide 82.20 g (421.4 mmol) of bromoacetic acid-tert-butyl ester is added to 50 g (127.7 mmol) of the title compound of Example 1b and 54.14 g (510.8 mmol) of sodium carbonate in 500 ml of acetonitrile, and it is stirred for 12 hours at 60° C. It is cooled to 0° C., and salts are filtered out. The filtrate is evaporated to the dry state, and the residue is chromatographed on silica gel (mobile solvent: methylene chloride/methanol=20:1).

Yield: 90.83 g (85% of theory) of a colorless solid Elementary analysis: Cld: C 54.54 H 7.59 N 8.37 Na 2.75 Br 9.55 Fnd: C 54.37 H 7.71 N 8.21 Na 2.83 Br 9.69 d) 10-(4-Carboxy-1-methyl-2-oxo-3-azabutyl)-1,4,7,10-tetraazacyclododecane-1,4,7-triacetic acid-tri-tert-butyl ester (sodium bromide complex)

90 g (107.5 mmol) of the title compound of Example 1c is dissolved in 1000 ml of isopropanol, and 5 g of palladium catalyst (10% Pd/C) is added. It is hydrogenated overnight at room temperature. Catalyst is filtered out, and the filtrate is evaporated to the dry state. The residue is recrystallized from dioxane.

Yield: 77.06 g (96% of theory) of a crystalline solid Elementary analysis: Cld: C 49.86 H 7.69 N 9.38 Na 3.08 Br 10.70 Fnd: C 49.73 H 7.79 N 9.21 Na 3.19 Br 10.83 e) 10-(4-Carboxy-1-methyl-2-oxo-3-azabutyl)-1,4,7,10-tetraazacyclododecane-1,4,7-triacetic acid 77 g (103.1 mmol) of the title compound of Example 1d is dissolved in 500 ml of trifluoroacetic acid, and it is stirred for 3 hours at room temperature. It is evaporated to the dry state, the residue is taken up in 300 ml of water, and the solution is added to a column, filled with Reillex$^{(R)}$ 425 PVP. It is eluted with water. The product-containing fractions are combined and evaporated to the dry state, and the residue is recrystallized from methanol/acetone.

Yield: 44.04 g (84% of theory) of a colorless, hygroscopic solid Water content: 6.5% Elementary analysis (relative to anhydrous substance): Cld: C 47.99 H 6.99 N 14.73 Fnd: C 47.83 H 7.12 N 14.55 f) Gadolinium complex of 10-(4-carboxy-1-methyl-2-oxo-3-azabutyl)-1,4,7,10-tetraaza-cyclododecane-1,4,7-triacetic acid, gadolinium-GlyMeDOTA acid 15.27 g (42.06 mmol) of gadolinium oxide is added to 40 g (84.12 mmol) of the title compound of Example 1e, dissolved in 400 ml of water, and it is heated for 3 hours to 90° C. It is evaporated to the dry state (vacuum), and the residue is recrystallized from 90% aqueous ethanol. The crystals are suctioned off, washed once with ethanol, then with acetone and finally with dimethyl ether and dried in a vacuum furnace at 130° C. (24 hours).

Yield: 50.53 g (93% of theory) of a colorless, crystalline powder Water content: 2.5% Elementary analysis (relative to anhydrous substance): Cld: C 36.24 H 4.80 N 11.12 Gd 24.97 Fnd: C 36.35 H 4.95 N 10.98 Gd 24.80 g) Polyrotaxane that consists of α-cyclodextrin and the PEG-bisamide derivative of O,O'-bis(aminoethyl)-PEG and gadolinium-GlyMeDOTA acid 13 g (13.4 mmol) of α-cyclodextrin is dissolved in 80 ml of water. After 1.01 g (0.3 mmol) of O,O'-bis(aminoethyl)-PEG (Sigma) is added, it is stirred for 30 minutes at room temperature, the suspension is then treated for 3 more minutes in an ultrasonic bath, and it is stirred overnight. The precipitate is suctioned off, washed with a little water and dried at 50° C. in a vacuum. 4.06 g of colorless powder is obtained. At the same time, 416 mg (0.66 mmol) of the gadolinium-GlyMeDOTA acid, described in Example 1f, and 77 mg of N-hydroxysuccinimide are dissolved in 5 ml of dimethyl sulfoxide while being heated. After cooling to room temperature, 136 mg of N,N'-dicyclohexylcarbodiimide is added, and it is stirred for 60 minutes. 4.06 g of the above-described dried α-cyclodextrin-pseudopolyrotaxane, dissolved in 50 ml of DMSO, and 67 mg (0.66 mmol) of triethylamine are added to the N-hydroxysuccinimide ester solution that is thus produced, and it is stirred overnight. The solution is then precipitated with diethyl ether. The precipitate is filtered off, washed with diethyl ether and chromatographed on an RP-18 column (mobile solvent: gradient that consists of acetonitrile/tetrahydrofuran/water).

Yield: 4.2 g of a colorless, amorphous powder Elementary analysis indicates occupation of 11 α-cyclodextrins/PEG. Elementary analysis (relative to anhydrous substance): Cld: C 46.04 H 6.75 Gd 2.06 N 1.10 Fnd: C 46.36 H 7.13 Gd 1.90 N 1.02 h) Polyrotaxane that consists of the 6,6',6",6"',6"",6""''-hexa-gadolinium-GlyMeDOTA ester of α-cyclodextrin and the PEG-bisamide derivative of O,O'-bis(aminoethyl)-PEG and gadolinium-GlyMeDOTA acid 2.0 g (0.13 mmol) of the title compound of Example 1g, 8.24 g (13 mmol) of the gadolinium-GlyMeDOTA acid, described in Example 1f, and 1.34 g (13 mmol) of sodium bromide are dissolved in 150 ml of formamide and cooled to 10° C. 3.30 g (16 mmol) of N,N'-dicyclohexylcarbodiimide and 0.122 g (1 mmol) of 4-dimethylaminopyridine are added and stirred for 2 hours at 10° C. and overnight at room temperature. The solution is poured into 1 l of acetone and stirred for 3 hours. The precipitate is filtered off, dissolved in water, and to separate low-molecular components, filtering is done via an AMICON$^{(R)}$ ultrafiltration membrane YM3 (cut off 3000 Dalton), and then freeze-drying is carried out. 5.30 g (66% of theory) of a colorless, flocculent lyophilizate is obtained.

$H_2O$ content (Karl-Fischer): 8.0% Gd determination (AAS): 17.2% Elementary analysis (relative to anhydrous substance): Cld: C 39.70 H 5.20 N 8.61 Gd 19.21 Fnd: C 39.31 H 5.44 N 8.76 Gd 18.39

EXAMPLE 2 a) Polyrotaxane that consists of α-cyclodextrin and the PEG-bisamide derivative of O,O'-bis(glycyl)-PEG and Nα-benzyloxycarbonyl-phenylalanine 13 g (13.4 mmol) of α-cyclodextrin is dissolved in 80 ml of water. After 1.04 g (0.3 mmol) of O,O'-bis(glycyl)-PEG (Shearwater Polymers, Inc.) is added, it is stirred for 30 minutes at room temperature, the suspension is then treated for 3 more minutes in an ultrasonic bath and stirred overnight. The precipitate is suctioned off, washed with a little water and dried at 50° C. in a vacuum. 4.77 g of colorless powder is obtained. Then, 261 mg (0.66 mmol) of Nα-benzyloxycarbonyl-phenylalanine-N-hydroxysuccinimide ester (Bachem), 134 mg (1.32 mmol) of triethylamine and 4.77 g of the dried α-cyclodextrin-pseudopolyrotaxane are dissolved in 50 ml of DMSO and stirred overnight. The solution is then mixed with 500 ml of diethyl ether. The precipitate is filtered off, washed with diethyl ether and chromatographed on an RP-18 column (mobile solvent: gradient that consists of acetonitrile/tetrahydrofuran/water).

Yield: 5.25 g of a colorless powder Elementary analysis indicates occupation of 14 α-cyclodextrins/PEG. Elementary analysis (relative to anhydrous substance): Cld: C 47.20 H 6.73 N 0.32 Fnd: C 46.88 H 6.91 N 0.41 b) Polyrotaxane that consists of the 6,6',6",6"',6"",6""''-hexa-gadolinium-GlyMeDOTA ester of α-cyclodextrin and the PEG-bisamide derivative of O,O'-bis (glycyl)-PEG and $N_\alpha$-benzyloxycarbonyl-phenylalanine 2.3 g (0.13 mmol) of the title compound of Example 2a, 8.24 g (13 mmol) of the gadolinium-GlyMeDOTA acid that is described in Example 1f and 1.34 g (13 mmol) of sodium bromide are reacted analogously to the instructions given in Example 1h and worked up. 6.67 g (70.2% of theory) of a colorless, flocculent lyophilizate is obtained.

$H_2O$ content (Karl-Fischer): 5.6% Gd determination (AAS): 17.7% Elementary analysis (relative to anhydrous substance): Cld: C 39.84 H 5.16 N 8.60 Gd 19.13 Fnd: C 39.41 H 5.30 N 8.84 Gd 18.80

EXAMPLE 3 a) 6,6',6",6"',6"",6""''-Hexa-gadolinium-GlyMeDOTA-ester of α-cyclodextrin 20 g (31.76 mmol) of the title compound of Example 1f, 6.53 g (63.5 mmol) of sodium bromide and 4.41 g (4.54 mmol) of α-cyclodextrin are dissolved in 200 ml of formamide and cooled to 10° C. 7.22 g (35 mmol) of N,N'-dicyclohexylcarbodiimide and 0.122 g (1 mmol) of 4-dimethylaminopyridine (DMAP) are now added and stirred for 2 hours at 10° C. and for 10 hours at room temperature. The solution is poured into a mixture of 1000 ml of acetone/200 ml of diethyl ether and stirred for one hour at room temperature. The deposited precipitate is filtered off, dissolved with a little water and chromatographed on an RP-18 column (mobile solvent: gradient that consists of acetonitrile/tetrahydrofuran/water).

Yield: 7.59 g (36% of theory) of a colorless powder $H_2O$ content (Karl-Fischer): 6.8% Elementary analysis (relative to anhydrous substance): Cld: C 38.80 H 4.95 N 9.05 Gd 20.32 Fnd: C 38.51 H 5.25 N 8.76 Gd 19.88 b) Polyrotaxane that consists of the 6,6',6",6"',6"",6""''-hexa-gadolinium-GlyMeDOTA ester of α-cyclodextrin and the PEG-bis-ester of PEG and gadolinium-GlyMeDOTA acid 10.3 g (2.23 mmol) of the title compound that is described in Example 3a is dissolved in 80 ml of water. After 340 mg (0.1 mmol) of polyethylene glycol 3400 (Shearwater Polymers, Inc.) is added, it is stirred for 15 minutes at room temperature in an ultrasonic bath and then overnight without acoustic irradiation. To separate low-molecular components, filtering is done via an AMICON$^{(R)}$ ultrafiltration membrane YM10 (cut off 10,000 Dalton) and then freeze-drying is carried out. 2.6 g of colorless, flocculent lyophilizate is obtained. The residue is mixed with toluene, and the suspension is evaporated to the dry state three times. Then, it is dissolved in 250 ml of formamide, mixed with 151 mg (0.24 mmol) of gadolinium-GlyMeDOTA acid (Example 1f) and cooled to 10° C. 50 mg (0.24 mmol) of N,N'-dicyclohexylcarbodiimide and 12 mg (0.1 mmol) of 4-dimethylaminopyridine (DMAP) are now added, stirred for 2 hours at 10° C. and overnight at room temperature. The solution is mixed with 1 l of acetone, the deposited precipitate is filtered off and filtered again via a YM 10 ultrafiltration membrane. The retentate is frozen and freeze-dried.

Yield: 2.5 g (45% of theory) $H_2O$ content (Karl-Fischer): 8.0% Gd determination (AAS): 17.2% Elementary analysis indicates occupation of 10 α-cyclodextrins/PEG. Elementary analysis (relative to anhydrous substance): Cld: C 39.77 H 5.22 N 8.52 Gd 19.12 Fnd: C 39.71 H 5.46 N 8.22 Gd 19.03

EXAMPLE 4 a) 6,6',6'',6''',6'''',6''''',6''''''-Hepta-Gadolinium-GlyMeDOTA-ester of β-cyclodextrin 20 g (31.76 mmol) of the title compound of Example 1f, 6.53 g (63.5 mmol) of sodium bromide and 4.51 g (3.97 mmol) of β-cyclodextrin are dissolved in 200 ml of formamide and cooled to 10° C. 7.22 g (35 mmol) of N,N'-dicyclohexylcarbodiimide and 0.122 g (1 mmol) of 4-dimethylaminopyridine are added and stirred for 2 hours at 10° C. and for 10 hours at room temperature. The solution is poured into a mixture of 1000 ml of acetone/200 ml of diethyl ether and stirred for one hour at room temperature. The deposited precipitate is filtered off, dissolved with a little water and chromatographed on an RP-18 column (mobile solvent: gradient that consists of acetonitrile/tetrahydrofuran/water).

Yield: 6.88 g (32% of theory) of a colorless, amorphous powder Water content: 7.5% Elementary analysis (relative to anhydrous substance): Cld: C 38.80 H 4.95 N 9.05 Gd 20.32 Fnd: C 38.47 H 5.19 N 8.81 Gd 19.79 b) Polyrotaxane that consists of 6,6',6'',6''',6'''',6''''',6''''''-hepta-gadolinium-GlyMeDOTA ester of β-cyclodextrin and the polypropylene glycol-bisamide derivative of O,O'-bis(aminopropyl) polypropylene glycol and gadolinium-GlyMeDOTA acid 12.1 g (2.23 mmol) of the title compound that is described in Example 4a is dissolved in 90 ml of water. After 200 mg (0.1 mmol) of poly(propyleneglycol)-bis(2-aminopropylether) (Sigma) is added, it is stirred for 15 minutes at room temperature in an ultrasonic bath and then stirred overnight without acoustic irradiation. To separate low-molecular components, filtering is done via an AMICON$^{(R)}$ ultrafiltration membrane YM10 (cut off 10,000 Dalton) and then freeze-drying is carried out. 3.1 g of colorless, flocculent lyophilizate is obtained. The residue is mixed with toluene, and the suspension is evaporated to the dry state three times. At the same time, 189 mg (0.3 mmol) of the gadolinium-GlyMeDOTA acid, described in Example 1f, and 35 mg of N-hydroxysuccinimide are dissolved in 5 ml of dimethylsulfoxide while being heated. After cooling to room temperature, 62 mg of N,N'-dicyclohexylcarbodiimide is added and stirred for 60 minutes. 3.1 g of the above-described dried pseudopolyrotaxane, dissolved in 50 ml of DMSO, and 30 mg (0.3 mmol) of triethylamine are added to the N-hydroxysuccinimide ester solution that is thus produced, and it is stirred overnight. The solution is then precipitated with acetone. The precipitate is filtered off, washed with acetone and filtered via a YM10 ultrafiltration membrane. The retentate is frozen and freeze-dried.

Yield: 3.1 g (50% of theory) H$_2$O content (Karl-Fischer): 6.9% Gd determination (AAS): 18.2% Elementary analysis indicates occupation of 10 β-cyclodextrins/polypropylene glycol. Elementary analysis (relative to anhydrous substance): Cld: C 39.58 H 5.14 N 8.83 Gd 19.71 Fnd: C 39.43 H 5.02 N 8.97 Gd 19.44

EXAMPLE 5

Polyrotaxane that consists of 6,6',6'',6''', 6'''',6''''',6''''''-hepta-gadolinium-GlyMeDOTA ester of β-cyclodextrin and the O,O'-polypropyleneglycol-bis-ester of polypropylene glycol and gadolinium-GlyMeDOTA acid 12.1 g (2.23 mmol) of the title compound that is described in Example 4a is dissolved in 90 ml of water. After 200 mg (0.1 mmol) of poly(propylene glycol) (Sigma) is added, it is stirred for 15 minutes at room temperature in an ultrasonic bath and then overnight without acoustic irradiation. To separate low-molecular components, filtering is done in water via an AMICON$^{(R)}$ ultrafiltration membrane YM10 (cut off 10,000 Dalton) and then freeze-drying is carried out. 3.2 g of colorless, flocculent lyophilizate is obtained. The residue is mixed with toluene, and the suspension is evaporated to the dry state three times. Then, it is dissolved in 250 ml of formamide, mixed with 151 mg (0.24 mmol) of the gadolinium-GlyMeDOTA acid that is described in Example 1f, and cooled to 10° C. 50 mg of (0.24 mmol) of N,N'-dicyclohexylcarbodiimide and 12 mg (0.1 mmol) of 4-dimethylaminopyridine (DMAP) are now added, stirred for 2 hours at 10° C. and overnight at room temperature. The solution is mixed with 1 l of acetone, the deposited precipitate is filtered off and again filtered via a YM 10 ultrafiltration membrane. The retentate is frozen and freeze-dried.

Yield: 3.1 g (56.0% of theory) H$_2$O content (Karl-Fischer): 6.3% Gd determination (AAS): 18.1% Elementary analysis indicates occupation of 9 α-cyclodextrins/polypropylene-glycol. Elementary analysis (relative to anhydrous substance): Cld: C 39.64 H 5.15 N 8.76 Gd 19.67 Fnd: C 39.88 H 5.02 N 8.96 Gd 19.14

EXAMPLE 6 a) 6,6', 6'',6''',6'''',6''''',6''''''-Heptaamino-6,6',6'',6''',6'''',6''''',6''''''-heptadeoxy-β-cyclodextrin-heptahydrochloride 1.90 g (1 mmol) of 6,6',6'',6''',6'''',6''''',6''''''-heptaamino-6,6',6'',6''',6'''',6''''',6''''''heptadeoxy-β-cyclodextrin-2,2',2'',2''',2'''',2''''',2'''''',3,3',3'',3''',3'''',3''''',3''''''-tetradecaacetate [J. Boger et al., Helv. Chim. Acta 61, 2190–2218 (1978)] is dissolved in dioxane/methanol (10:1), and after 14 ml (28 mmol) of 2N sodium hydroxide solution is added, it is stirred for 2 hours at room temperature and then set at pH 7 with dilute hydrochloric acid. The neutralized solution is evaporated to the dry state in a vacuum, the residue is washed in succession with chloroform and water and again evaporated to the dry state. The heptakis (6-azido-6-deoxy)-β-CD that is obtained is suspended under nitrogen in dioxane/methanol (5:1), mixed with 5.25 g (20 mmol) of triphenylphosphine, the solution that is produced is stirred for one hour at room temperature and then mixed with concentrated ammonia. After it is stirred overnight, it is evaporated to the dry state in a vacuum, taken up with water and set at pH 6 with 1N hydrochloric acid, and the solution is freeze-dried. 1.33 g of colorless, flocculent powder (85% of theory) is obtained.

H$_2$O content (Karl-Fischer): 11.5% Elementary analysis (relative to anhydrous substance): Cld: C 36.47 H 6.12 N 7.09 Cl 17.94 Fnd: C 36.77 H 6.21 N 6.86 Cl 17.71 b) Hepta-amide that consists of 6,6',6'',6''',6'''',6''''',6''''''-heptaamino-6,6',6'',6''',6'''',6''''',6''''''-heptadeoxy-β-cyclodextrin and DTPA(t-butyl)4-monocarboxylic acid 20 g (32.37 mmol) of 3,9-bis-(tert-butoxycarbonylmethyl)-6-carboxymethyl-3,6,9-triaza-undecane-di-tert-butyl ester (produced according to DE 19507822, Schering AG) and 5.56 g (40 mmol) of 4-nitrophenol are dissolved in 200 ml of dimethylformamide and cooled to 0° C. 7.43 g (36 mmol) of N,N'-dicyclohexylcarbodiimide is added, and it is stirred for 2 hours at 0° C., then for 12 hours at room temperature. 4.56 g (4.05 mmol) of 6,6',6'',6''',6'''',6''''',6''''''-heptaamino-6,6', 6'',6''',6'''',6''''',6''''''-heptadeoxy-β-cyclodextrin is added to this solution, and it is heated for 12 hours at 40° C. 0.5 ml of water is added, it is stirred for 10 minutes at 40° C. and cooled to 0° C. Precipitated dicyclohexyl urea is filtered off, and the filtrate is evaporated to the dry state in a vacuum. The residue is chromatographed on silica gel (mobile solvent: ethyl acetate/ethanol: 20:1).

Yield: 14.88 g (69% of theory) of a colorless, viscous oil Elementary analysis: Cld: C 56.83 H 8.48 N 7.36 Fnd: C 56.66 H 8.61 N 7.21 c) Hepta-amide that consists of 6,6',6'',6''',6'''',6''''',6''''''-heptaamino-6,6',6'',6''',6'''',6''''',6''''''-heptadeoxy-β-cyclodextrin and gadolinium-DTPA 12 g (2.25 mmol) of the title compound of Example 6b and 10.8 g (100 mmol) of anisole are dissolved in 200 ml of trifluoroacetic acid. It is evaporated to the dry state in a vacuum, the residue is taken up in 800 ml of diethyl ether, and it is stirred for one hour at room temperature. The precipitated solid is dissolved in 200 ml of water, and the pH is set at 4 with 2N aqueous sodium hydroxide solution. 5.27 g (15.77 mmol) of gadolinium acetate is added, and it is stirred for 2 hours at 70° C. It is cooled to room temperature and set at pH 7.2 with 2N aqueous sodium hydroxide solution. The solution is filtered, and the filtrate is loaded into an ultrafiltration cell (AMICON YM 3, cut off 3 kDa). Dialysis is done with water (6 passes); then it is freeze-dried.

Yield: 10.66 g (95% of theory) of a colorless, amorphous powder Water content: 10.3% Elementary analysis (relative to anhydrous substance): Cld: C 33.71 H 3.96 N 7.86 Gd 22.06 Na 3.23 Fnd: C 33.51 H 4.19 N 7.66 Gd 21.87 Na 3.01 d) Polyrotaxane that consists of GdDTPA-heptaamide of the 6,6',6'',6''',6'''',6''''',6''''''heptaamino-6,6',6'',6''',6'''',6''''',6''''''-heptadeoxy-β-cyclodextrin and the polypropyleneglycol-bisamide derivative of O,O'-bis(aminopropyl)-polypropylene glycol and $N_\alpha$-benzyloxycarbonyl-phenylalanine 10.8 g (2.23 mmol) of the title compound that is described in Example 6c is dissolved in 100 ml of water. After 200 mg (0.1 mmol) of poly(propyleneglycol)-bis(2-amino-propyl ether) (Sigma) is added, it is stirred for 15 minutes at room temperature in an ultrasonic bath and then overnight without acoustic irradiation. To separate low-molecular components, filtering is done via a YM10-ultrafiltration membrane (Amicon$^{(R)}$) and then freeze-drying is carried out. 3.9 g of colorless, flocculent lyophilizate is obtained. The residue is dried at 50° C. in a vacuum. Then, 103 mg (0.25 mmol) of $N_\alpha$-benzyloxycarbonyl-tyrosine-N-hydroxysuccinimide ester (Bachem), 51 mg of triethylamine and 3.9 g of dried β-cyclodextrin-pseuodopolyrotaxane are dissolved in 40 ml of DMSO and stirred overnight at room temperature. The solution is then precipitated with acetone. The precipitate is filtered off, washed with acetone and ultrafiltered (YM 10). The retentate is freeze-dried.

Yield: 3.4 g (49% of theory) H$_2$O content (Karl-Fischer): 5.9% Gd determination (AAS): 20.1%. Elementary analysis indicates occupation of 13 β-cyclodextrins/polypropylene glycol. Elementary analysis (relative to anhydrous substance): Cld: C 35.97 H 4.30 N 7.88 Gd 21.88 Fnd: C 36.20 H 4.09 N 7.99 Gd 21.21

EXAMPLE 7 a) 10-[5-(2-Carboxyphenyl)-2-hydroxy-5-oxo-4-aza-pentyl]-1,4,7-tris(carboxymethyl)-1,4,7,10-tetraazacyclododecane 50 g (144.3 mmol) of 1,4,7-tris(carboxymethyl)-1,4,7,10-tetraazacyclododecane (D03A) is dissolved in 250 ml of water, and the pH is set at 13 with 5N sodium hydroxide solution. Then, a solution of 38.12 g (187.6 mmol) of N(2,3-epoxypropyl)-phthalimide (Aldrich) in 100 ml of dioxane is added in drops within one hour, stirred for 24 hours at 50° C., and the pH is kept at 13 by adding 5N sodium hydroxide solution. The solution is set at pH 2 with 10% hydrochloric acid and evaporated to the dry state in a vacuum. The residue is dissolved in some water and purified on an ion exchange column (Reillex$^{(R)}$=poly-(4-vinyl)-pyridine) (it is eluted with water). The main fractions are concentrated by evaporation in a vacuum, and final purification of the residue is achieved by chromatography on RP-18 (LiChroPrep$^{(R)}$/mobile solvent: gradient that consists of tetrahydrofuran/methanol/water). After the main fractions are concentrated by evaporation, 63.57 g (71% of theory) of an amorphous solid is obtained.

Water content: 8.5% Elementary analysis (relative to anhydrous substance): Cld: C 52.90 H 6.57 N 12.34 Fnd: C 52.65 H 6.68 N 12.15 b) 10-(3-Amino-2-hydroxy-propyl)-1,4,7-tris(carboxymethyl)-1,4,7,10-tetraazacyclododecane 50 g (88.1 mmol) of the title compound of Example 7a is refluxed in 300 ml of concentrated hydrochloric acid for 24 hours. It is evaporated to the dry state, the residue is dissolved in some water and purified on an ion exchange column (Reillex$^{(R)}$=poly-(4-vinyl)pyridine (it is eluted with water). The main fractions are evaporated to the dry state. Yield: 39.0 g (95% of theory) of a vitreous solid Water content: 10.3% Elementary analysis (relative to anhydrous substance): Cld: C 48.68 H 7.93 N 16.70 Fnd: C 48.47 H 8.09 N 16.55 c) Gadolinium complex of 10-(3-amino-2-hydroxy-propyl)-1,4,7-tris(carboxymethyl)-1,4,7,10-tetraazacyclododecane 38 g (90.6 mmol) of the title compound of Example 7b is dissolved in 300 ml of water, and 16.42 g (45.3 mmol) of gadolinium oxide is added. It is heated for 3 hours to 90° C. The cooled solution is stirred with 5 ml each of acidic ion exchanger (IR-120/H$^+$ form) and 5 ml of basic exchanger (IRA-410/OH$^-$ form) for one hour at room temperature. Exchanger is filtered off. Freeze-drying the filtrate yields 57.23 g (98% of theory) of an amorphous solid.

Water content: 11.3% Elementary analysis (relative to anhydrous substance): Cld: C 35.59 H 5.27 Gd 27.41 N 12.21 Fnd: C 35.32 H 5.38 Gd 27.20 N 12.31 d) Gadolinium complex of 10-[7-(4-nitrophenyl)-2-hydroxy-5-oxo-7-(carboxymethyl)-4-aza-heptyl]-1,4,7-tris(carboxymethyl)-1,4,7,10-tetraazacyclododecane 9.84 g (41.8 mmol) of 3-(4-nitrophenyl)-glutaric anhydride is added to 20 g (34.86 mmol) of the title compound of Example 7c in 200 ml of dimethylformamide/20 ml of triethylamine (Journal of Org. Chem., Vol. 26, 3856 (1961)), and it is stirred overnight at room temperature. It is evaporated to the dry state in a vacuum. The residue is recrystallized from isopropanol/acetic acid at a ratio of 95:5.

Yield: 27.46 g (94% of theory) of a yellowish solid Water content: 3.4% Elementary analysis (relative to anhydrous substance): Cld: C 41.58 H 4.86 Gd 19.44 N 10.39 Fnd: C 41.38 H 4.97 Gd 19.28 N 10.17 e) Gadolinium complex of 10-[7-(4-aminophenyl)-2-hydroxy-5-oxo-7-(carboxymethyl)-4-aza-heptyl]-1,4,7-tris(carboxymethyl)-1,4,7,10-tetraazacyclododecane 25 g (30.9 mmol) of the title compound of Example 7d is dissolved in 250 ml of methanol, and 5 g of palladium catalyst (10% Pd on C) is added. It is hydrogenated overnight at room temperature. The catalyst is filtered off, and the filtrate is evaporated to the dry state in a vacuum.

Yield: 24.07 g (97% of theory) of a cream-colored solid Water content: 3.0% Elementary analysis (relative to anhydrous substance): Cld: C 43.18 H 5.31 Gd 20.19 N 10.79 Fnd: C 43.27 H 5.48 Gd 20.02 N 10.61 f) Gadolinium complex of 10-[7-(4-isothiocyanatophenyl)-2-hydroxy-5-oxo-7-(carboxymethyl)-4-aza-heptyl]-1,4,7-tris(carboxymethyl)-1,4,7,10-tetraazacyclododecane 15 g (19.26 mmol) of the title compound of Example 7e is dissolved in 100 ml of water, and 6.64 g (57.8 mmol) of thiophosgene in 50 ml of chloroform is added. It is stirred for 1 hour at 50° C. It is cooled to room temperature, the organic phase is separated, and the aqueous phase is shaken out twice with 100 ml of chloroform. The aqueous phase is evaporated to the dry state, and the residue is absorptively precipitated in 100 ml of isopropanol at room temperature. The solid is filtered off and washed with ether. After drying overnight in a vacuum (40° C.), 15.9 g (98% of theory) of a cream-colored solid is obtained.

Water content: 3.5% Elementary analysis (relative to anhydrous substance): Cld: C 42.43 H 4.79 Gd 19.15 N 10.24 S 3.91 Fnd: C 42.23 H 4.90 Gd 19.01 N 10.05 S 3.96 g) 6,6',6",6'",6"",6'""-Hexakis(N-fluorenylmethoxycarbonyl-alanyl)-α-cyclodextrin 2.08 g (2 mmol; water content 7%) of α-cyclodextrin is dissolved in dimethylformamide, mixed with benzene and dehydrated azeotropically. It is then cooled to 0° C., 1.32 ml (12 mmol) of N-methylmorpholine is added, and after 4.05 g (12 mmol) of N-fluorenylmethoxycarbonyl-alanine-N-carboxylic anhydride, Fmoc-Ala-NCA (propeptides, SNPE GmbH, Frankfurt/M.), is added, it is stirred overnight at room temperature. The solution is then concentrated by evaporation in a vacuum, the residue is washed with water and finally recrystallized from ethyl acetate.

Yield: 5.08 g (93% of theory) Elementary analysis (relative to anhydrous substance): Cld: C 63.29 H 5.53 N 3.08 Fnd: C 63.14 H 5.70 N 2.98 h) Hexa-thiourea conjugate that consists of hexakis-(O-alanyl)-α-CD with the gadolinium complex of 10-[7-(4-isothiocyanatophenyl)-2-hydroxy-5-oxo-7-(carboxymethyl)-4-azaheptyl]-1,4,7-tris(carboxymethyl)-1,4,7,10-tetraazacyclododecane 2.78 g (1 mmol) of the hexakis-[O-(Fmoc-alanyl)]-α-CD's described in Example 7g above is dissolved in dimethylformamide and mixed with 4 g of 4-dimethylaminopyridine. After 15 minutes of stirring at room temperature, 5.31 g (6.3 mmol) of the isothiocyanate that is described in Example 7f is added, and it is stirred overnight. The solution is then concentrated by evaporation in a vacuum, taken up with water, set at pH 7, and low-molecular portions are removed via an AMICON$^{(R)}$ ultrafiltration membrane YM 1. After ultrafiltration has been completed, it is set at pH 7 again with dilute sodium hydroxide solution, and the retentate is frozen and freeze-dried. 6.78 g (97% of theory) of slightly yellowish, flocculent powder is obtained. Analytical sample-dyeing with ninhydrin shows that free amino groups are no longer present in the thiourea conjugate.

Water content (Karl-Fischer): 8.3% Gd determination (AAS): 13.2% Elementary analysis (relative to anhydrous substance): Cld: C 42.41 H 4.96 Gd 14.61 N 9.11 Na 2.14 S 2.98 Fnd: C 42.25 H 5.10 Gd 14.26 N 9.01 Na 1.79 S 2.66 i) Polyrotaxane that consists of the hexa-thiourea conjugate of α-cyclodextrin, described in Example 7h above, and the N,N'-bis-thiourea conjugate of O,O'-bis(aminoethyl)-PEG and the gadolinium complex of 10-[7-(4-isothiocyanatophenyl)-2-hydroxy-5-oxo-7-(carboxymethyl)-4-azaheptyl]-1,4,7-tris(carboxymethyl)-1,4,7,10-tetraazacyclododecane 22.60 g (3.5 mmol) of the hexa-thiourea conjugate of α-cyclodextrin, described in Example 7h, is dissolved in 200 ml of water. After 337 mg (0.1 mmol) of O,O'-bis (aminoethyl)-PEG (Sigma) is added, it is stirred for 30 minutes in an ultrasonic bath and overnight without acoustic irradiation at room temperature. To separate the nonthreaded components, ultrafiltration is done (YM 10) and then freeze-drying is carried out. 7.2 g of light yellowish powder is obtained. The residue is again taken up in water, mixed with 211 mg (0.25 mmol) of the isothiocyanate that is described in Example 7f and stirred overnight. The solution is then set at pH 7, ultrafiltered (YM 30, cut off 30 kDa), and the retentate is freeze-dried. 6.9 g (45.9% of theory) of a light yellow flocculent powder is obtained.

H$_2$O content (Karl-Fischer): 10.2% Gd determination (AAS): 12.8% Elementary analysis indicates occupation of 20 α-cyclodextrins/PEG Elementary analysis (relative to anhydrous substance): Cld: C 42.69 H 5.07 N 8.91 S 2.92 Gd 14.30 Na 2.09 Fnd: C 42.20 H 5.31 N 8.67 S 2.34 Gd 14.56 Na 1.80

EXAMPLE 8 a) Hexa-amide that consists of 6,6',6",6'",6"",6'""-hexaamino, 6,6',6",6'",6"",6'""-hexadeoxy-α-cyclodextrin and gadolinium-GlyMeDOTA acid 20 g (31.76 mmol) of the title compound of Example 1f, 2.69 g (63.5 mmol) of lithium chloride and 5.56 g (40 mmol) of 4-nitrophenol are dissolved in 250 ml of dimethyl sulfoxide at 60° C. It is cooled to 16° C., and 7.22 g (35 mmol) of N,N'-dicyclohexylcarbodiimide is added, and it is stirred for 12 hours at room temperature. 4.39 g (4.54 mmol) of 6,6',6",6'",6"",6'""-hexaamino-6,6',6",6'",6"",6'""-hexadeoxy-α-cyclodextrin [J. Boger et al., Helv. Chim. Acta 61, 2190–2218 (1978)] is added to this solution, and it is heated for 12 hours at 60° C. It is cooled to room temperature, and the solution is poured into a mixture of 800 ml of acetone and 200 ml of diethyl ether and stirred for one hour at room temperature. The precipitate is filtered off and dissolved in 200 ml of water. The N,N'-dicyclohexylurea that is precipitated in this case is filtered off, and the filtrate is brought into an ultrafiltration cell (AMICON, YM 3, cut off 3 kDa). Dialysis is done with water (6 passes). Then, it is freeze-dried.

Yield: 15.58 g (74% of theory) of a colorless, amorphous powder H$_2$O content (Karl-Fischer): 6.9% Elementary analysis (relative to anhydrous substance): Cld: C 38.85 H 5.09 N 10.87 Gd 20.35 Fnd: C 38.51 H 5.31 N 10.61 Gd 20.11 b) Polyrotaxane that consists of the hexaamide of α-cyclodextrin, described in Example 8a above, and the PEG-bisamide derivative of O,O'-bis-(glycyl)-PEG and gadolinium-GlyMeDOTA acid 10.3 g (2.23 mmol) of the title compound that is described in Example 8a is dissolved in 80 ml of water. After 340 mg (0.1 mmol) of O,O'-bis(glycyl)-PEG (Shearwater Polymers, Inc.) is added, it is stirred for 15 minutes at room temperature in an ultrasonic bath and then overnight without acoustic irradiation. To separate low-molecular components, filtering is done via an AMICON$^{(R)}$ ultrafiltration membrane YM10 (cut off 10,000 Daltons) and then freeze-drying is carried out. 2.9 g of colorless, flocculent lyophilizate is obtained. The residue is mixed with toluene, and the suspension is evaporated to the dry state three times. At the same time, 189 mg (0.3 mmol) of the gadolinium GlyMeDOTA acid, described in Example 1f, and 35 mg of N-hydroxysuccinimide are dissolved in 5 ml of dimethyl sulfoxide while being heated. After cooling to room temperature, 62 mg of N,N'-dicyclohexylcarbodiimide is added and stirred for 60 minutes. 2.9 g of the above-described dried pseudopolyrotaxane, dissolved in 50 ml of DMSO, and 30 mg (0.3 mmol) of triethylamine are added to the N-hydroxysuccinimide ester solution that is thus produced, and it is stirred overnight. The solution is then precipitated with acetone. The precipitate is filtered off, washed with acetone and filtered via a YM 10 ultrafiltration membrane. The retentate is frozen and freeze-dried.

Yield: 3.0 g (51% of theory) H$_2$O content (Karl-Fischer): 5.0% Gd determination (AAS): 18.4% Elementary analysis indicates occupation of 11 α-cyclodextrins/PEG. Elementary analysis (relative to anhydrous substance): Cld: C 39.76 H 5.32 N 10.26 Gd 19.19 Fnd: C 39.39 H 5.47 N 10.60 Gd 18.74

EXAMPLE 9

Polyrotaxane that consists of α-cyclodextrin-hexaamide, formed from 6,6',6'',6''',6'''',6''''',6''''''-hexaamino-6,6',6'',6''',6'''',6''''',6''''''-hexadeoxy-α-cyclodextrin and gadolinium-GlyMeDOTA acid and the PEG-bisamide derivative of O,O'-bis-(aminoethyl)-PEG and gadolinium-GlyMeDOTA acid in a single-pot process 4.31 g (4.46 mmol) of 6,6',6'',6''',6'''',6''''',6''''''-hexaamino-6,6',6'',6''',6'''',6''''',6''''''-hexadeoxy-α-cyclodextrin is dissolved in 50 ml of water. After 340 mg (0.1 mmol) of O,O'-bis(aminoethyl)-PEG (Sigma) is added, it is stirred for 30 minutes at room temperature, the suspension is then treated for another 3 minutes in an ultrasonic bath and stirred overnight. The precipitate is suctioned off, washed with a little water and dried at 50° C. in a vacuum. 1.3 g of colorless powder is obtained. At the same time, 6.29 g (10 mmol) of the gadolinium-GlyMeDOTa acid, described in Example 1f, and 1.2 g of N-hydroxysuccinimide in 75 ml of dimethyl sulfoxide are dissolved while being heated. After cooling to room temperature, 2.1 g of N,N'-dicyclohexylcarbodiimide is added, and it is stirred for 60 minutes. 1.3 g of the above-described dried α-cyclodextrin-pseudopolyrotaxane, dissolved in 25 ml of DMSO, and 1.01 g (10 mmol) of triethylamine are added to the N-hydroxysuccinimide ester solution that is thus produced, and it is stirred overnight. The solution is then precipitated with diethyl ether. The precipitate is filtered off, washed with diethyl ether and chromatographed on an RP-18 column (mobile solvent: gradient that consists of acetonitrile/tetrahydrofuran/water).

Yield: 2.2 g (41.5% of theory) of a colorless, amorphous powder $H_2O$ content (Karl-Fischer): 4.0% Gd determination (AAS): 18.4% Elementary analysis indicates occupation of 10 α-cyclodextrins/PEG. Elementary analysis (relative to anhydrous substance): Cld: C 39.83 H 5.34 N 10.23 Gd 19.13 Fnd: C 39.80 H 5.62 N 10.03 Gd 18.79

EXAMPLE 10 a) Hexaamide derivative of 2,4,6-triiodo-3-N-(2-hydroxyethyl)-5-(hydroxy)acetamido-isophthalic acid with 6,6',6'',6''',6'''',6''''',6''''''-hexaamino-6,6',6'',6''',6'''',6''''',6''''''-hexadeoxy-α-cyclodextrin 2.02 g (20 mmol) of triethylamine and 5.03 g (6.60 mmol) of the acid chloride of 2,4,6-triiodo-3-N-(2-acetoxyethyl)-5-acetoxy-acetamido-isophthalic acid [Guerbet S. A., WO 93/10824] are added to 1.26 g (1 mmol) of 6,6',6'',6''',6'''',6''''',6''''''-hexaamino-6,6',6'',6''',6'''',6''''',6''''''-hexadeoxy-α-cyclodextrin-hexahydrochloride [J. Boger, R. J. Corcoran and J.-M. Lehn, Helv. Chim. Acta 61, 2190–2218 (1978)] in 40 ml of N,N-dimethylacetamide. It is stirred for 24 hours at room temperature. It is evaporated to the dry state in a vacuum, the residue is dissolved in 200 ml of methylene chloride and washed twice with 100 ml each of 5% aqueous hydrochloric acid and 100 ml of 5% sodium carbonate solution. The organic phase is evaporated to the dry state in a vacuum, the residue is dissolved in 200 ml of methanol, and ammonia (gas) is introduced at 0° C. until saturation is achieved. It is stirred for 6 hours at 0° C., then for 15 hours at 40° C. It is evaporated to the dry state, and the residue is chromatographed on an RP-18 column (mobile solvent: gradient that consists of water/acetonitrile/n-propanol).

Yield: 4.1 g (85% of theory) of a colorless solid Water content: 1.2% Elementary analysis (relative to anhydrous substance): Cld: C 26.92 H 2.51 N 5.23 J 47.41 Fnd: C 26.71 H 2.70 N 5.05 J 47.19 b) Polyrotaxane that consists of the hexaamide derivative of 2,4,6-triiodo-3-N-(2-hydroxyethyl)-5-(hydroxy)acetamido-isophthalic acid with 6,6',6'',6''',6'''',6''''',6''''''-hexaamino-6,6',6'',6''',6'''',6''''',6''''''-hexadeoxy-α-cyclodextrin and the PEG-bisamide derivative of O,O'-bis(glycyl)-PEG and $N_\alpha$-benzyloxycarbonyl-phenylalanine 20.57 g (4.47 mmol) of the iodine-containing α-cyclodextrin that is described in Example boa is dissolved in 200 ml of water. After 350 mg (0.1 mmol) of O,O'-bis(glycyl)-PEG (Shearwater Polymers, Inc.) is added, it is stirred for 30 minutes at room temperature, the suspension is then treated for 3 minutes in an ultrasonic bath and stirred overnight. The precipitate is suctioned off, washed with a little water and dried at 50° C. in a vacuum. 4.1 g of colorless powder is obtained. Then, 87 mg (0.22 mmol) of $N_\alpha$-benzyloxycarbonyl-phenylalanine-N-hydroxysuccinimide ester (Bachem), 45 mg of triethylamine and 4.1 g of dried α-cyclodextrin-pseudopolyrotaxane are dissolved in 50 ml of DMSO and stirred overnight. The solution is then mixed with 500 ml of diethyl ether. The precipitate is filtered off, washed with diethyl ether and chromatographed on an RP-18 column (mobile solvent: gradient that consists of acetonitrile/tetrahydrofuran/water).

Yield: 3.69 g (41.5% of theory) of a colorless, amorphous powder $H_2O$ content (Karl-Fischer): 6.0% Elementary analysis indicates occupation of 12 α-cyclodextrins/PEG. Elementary analysis (relative to anhydrous substance): Cld: C 28.85 H 2.90 N 4.98 I 44.31 Fnd: C 29.04 H 2.78 N 5.12 I 44.11

We claim:

1. Polyrotaxanes that contain metal complexes or iodine-containing benzene derivatives as imaging components for MRT diagnosis and x-ray diagnosis.

2. Polyrotaxanes of formula I

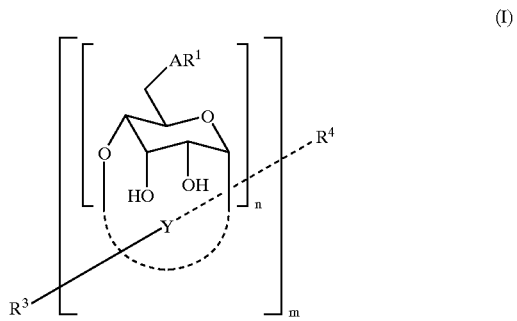

in which n means the numbers 6, 7 or 8, m means the numbers 2 to 50,

A means an oxygen atom or the group —XNH—, in which

X means a direct bond or the radical —O—(CO$_x$—CHR—(CH$_2$)$_y$— with x meaning numbers 0 or 1 and y meaning numbers 0 to 10, $R^1$ means opacifying radicals II, III, IV, V, VI, VII, VIII, IX or X

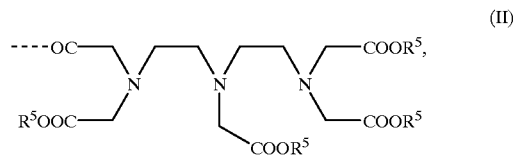

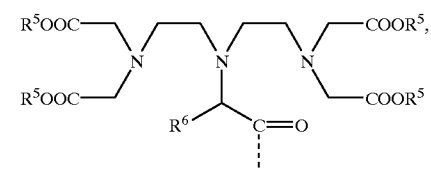
(III)

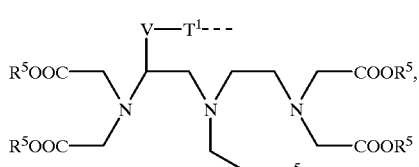
(IV)

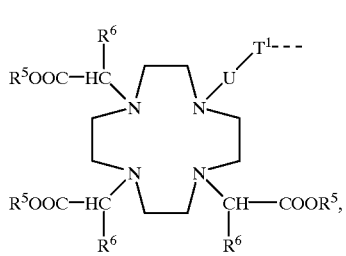
(V)

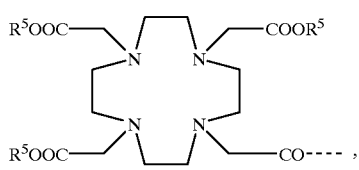
(VI)

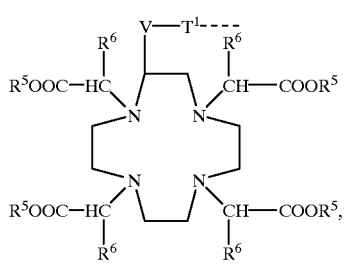
(VII)

in which
- $R^5$, independently of one another, mean a hydrogen atom or a metal ion equivalent of the elements of atomic numbers 20–32, 37–39, 42–44, 49 or 57–83,
- $R^6$ means a hydrogen atom, a straight-chain or branched $C_1$–$C_7$ alkyl radical, a phenyl or benzyl radical,
- V means a —$CH_2$—($CH_2$)—$(O)_p$

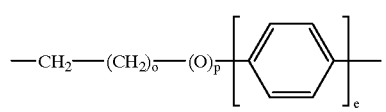

group with
- o meaning numbers 0 to 10,
- p and e in each case meaning the numbers 0 or 1, provided that p only stands for number 1 if e means number 1,
- $T^1$ means an —NHCS or —CO group, U means a —$CHR^7$—$CONR^7$—$M^1$ or —$CH_2$—$CH(OH)$—$M^2$ group with $R^7$ and $R^{7'}$, independently of one another, meaning $R^6$ or the group —$CH_2$—$(CH_2)_o$—COOH and $M^1$ and $M^2$ in each case meaning a phenylene radical or a straight-chain, branched, saturated or unsaturated $C_1$–$C_{20}$ alkylene chain, which optionally is substituted by 1–5 $(CH_2)_o$—COOH, 1–5 $OR^6$ radicals or 1–8 oxygen atoms, 1–2 —NH, 1–2 —C(=NH), 1–5 —$CONR^7$, 1–5 —$NR^7CO$, 1–2 phenylene or 1–2 phenylenoxy groups, provided that at least two of radicals $R^5$ stand for metal ion equivalents of the elements of the above-mentioned atomic numbers and optionally cations of inorganic and/or organic bases, amino acids or amino acid amides,

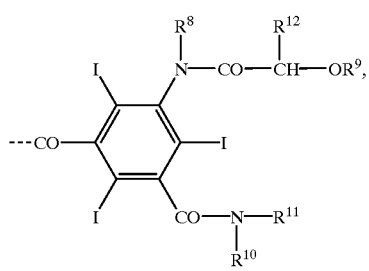
(VIII)

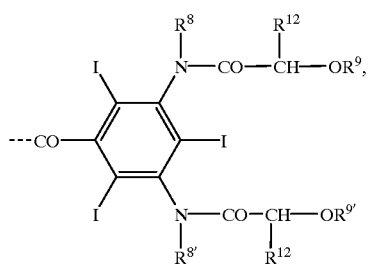
(IX)

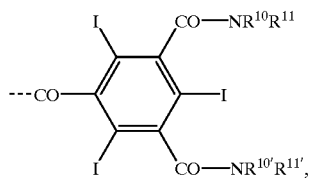
(X)

with
- $R^8$, $R^{8'}$, $R^{10}$, $R^{10'}$, $R^{11}$, $R^{11'}$, which can be the same or different, meaning hydrogen or straight-chain alkyl with 2–6 C atoms or branched-chain alkyl with 3–6 C atoms, whereby both alkyl radicals can be substituted with 1–5 OH groups,
- $R^9$, $R^{9'}$, $R^{12}$, which can be the same or different, meaning hydrogen or methyl and
- Y means the radicals —W—$(CH_2)_2[O—CH_2—CH_2]_q$—W,

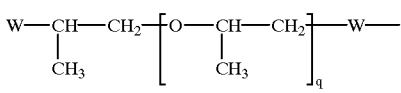

in which q means the numbers 8 to 200, W means the NH group or the O atom, and
- $R^3$ and $R^4$, independently of one another, mean a substituent with a diameter of at least 0.6 nm.

3. Polyrotaxanes of formula I according to claim 2, characterized in that the groups that stand for $R^3$ and $R^4$ are bonded to Y as ester, amide, ether, thioester, thioamide or carbonate.

4. Polyrotaxanes of formula 1 according to claim 2, wherein $R^3$ and $R^4$, independently of one another, stand for $R^1$ or a

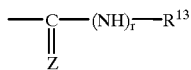 group with Z meaning an oxygen or sulfur atom and r group with Z meaning an oxygen or sulfur atom and r meaning the numbers 0 or 1, whereby $R^{13}$ stands for a saturated, unsaturated, straight-chain or branched $C_1$-$C_{30}$ alkyl chain, which can be interrupted by 1–3 —NH—CO—O—, —O—OC—NH—, —NHCO—, OCNH—, NHCS—, —SCNH—, —NH—CS—NH—, —NH—CO—NH—, —CO—O—, —O—OC—, $NR^6$—, —CO—, —$SO_2$—, —SO—, 1–2 phenylene, phenylenoxy, cyclohexylidene groups, 1–3 oxygen, sulfur atoms and/or can be substituted by 1–5 —OH—, —$OCH_3$—, 1–3 —$CH_2OH$—, —$NHCOR^6$—, —$CONHR^6$—, —COOH—, —$(CH_2)_{1-5}$—COOH—, —$CH_2$—$C_6H_4$—OH—, —$CH_2$—$C_6H_5$—, $C_6H_5$—, naphthyl, pyridyl, cyclohexyl, thiophenyl groups, whereby the optionally present aromatic groups optionally can contain 1–3 chlorine-, bromine-, $CH_3$—, COOH—, $CH_2OH$—, $OCH_3$-substituents.

5. Pharmaceutical agents that contain at least one polyrotaxane complex according to general formula I of claim 2, optionally with the additives that are commonly used in galenicals.

6. Method of NMR diagnosis or x-ray diagnosis comprising administering to a subject at least one polyrotaxane complex according to general formula I of claim 2 and taking an NMR image or x-ray image of said subject.

7. Method of angiography comprising administering to a subject at least one polyrotaxane complex according to general formula I of claim 2 and performing angiography on said subject.

8. Method of lymphography comprising administering to a subject at least one polyrotaxane complex according to general formula I of claim 2 and performing lymphography on said subject.

9. Process for the production of polyrotaxane complexes according to general formula I of claim 2, wherein compounds of general formula II (II)

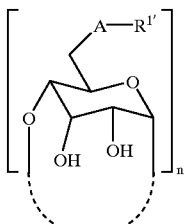

in which
A and n have the above-indicated meanings and
$R^1$ stands for a hydrogen atom or the radical II', III', IV', V', VI', VII', VIII', IX' or X', in which the latter have the meaning that is indicated for II-X, but radicals $R^5$ that are present in them stand for hydrogen or acid protective groups and optionally present hydroxy groups are optionally present in protected form, are reacted with compounds of general formula XI

H—Y—H          (XI)

to compounds of general formula XII (XII)

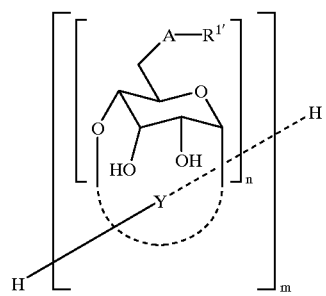

and the latter are reacted with a compound $R^{3'}$-Fg and/or $R^{4'}$-Fg, in which $R^{3'}$ and $R^{4'}$ have the meaning that is indicated for $R^3$ and $R^4$, but radical $R^5$ that is in $R^1$ stands for hydrogen, acid protective groups or a metal ion equivalent of the elements of the above-mentioned atomic numbers and Fg stands for anhydride, —Cl, —F, —OH, —$N_3$,

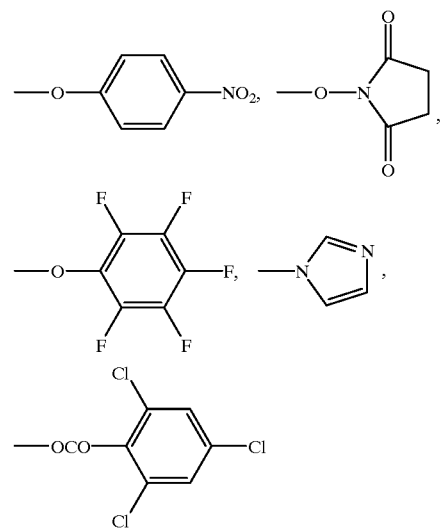

whereby if $R^3$ and/or $R^4$ in (I) stand for a radical

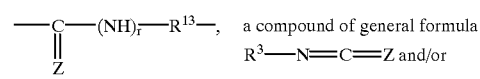, a compound of general formula $R^3$—N=C=Z and/or a compound of general formula $R^3$—N=C=Z and/or $R^4$—N=C=Z is used, and if $T^1$ stands for an NHCS group in IV, V and VII, a compound of general formula IV", V" or VII'

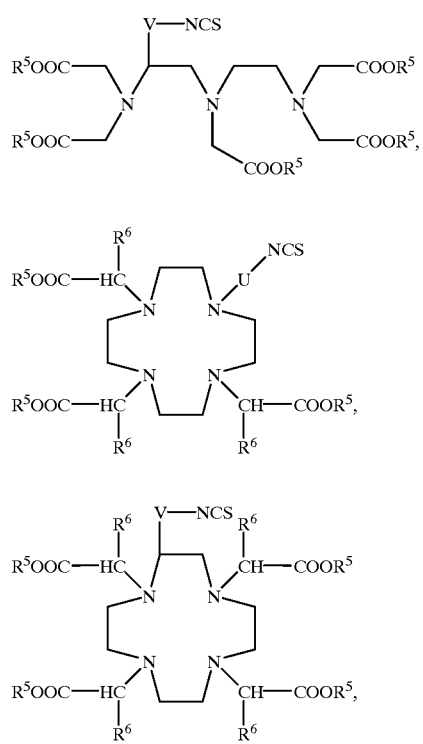

(IV″)

(V″)

(VII″)

is used, the thus obtained compound of general formula XIII

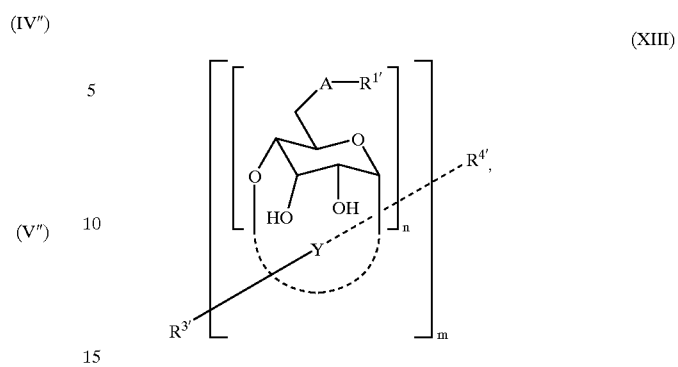

(XIII)

if $R^{1'}$ has the meaning of hydrogen, is reacted with a compound $R^{1''}$-Fg, in which $R^{1''}$ has the meaning indicated for $R^1$, but radicals $R^5$ that are present in them stand for hydrogen, acid protective groups or a metal ion equivalent of the elements of the above-mentioned atomic numbers, or is reacted with compounds of general formula IV″, V″ or VII″ and then, if $R^5$ in XIII does not stand for the above-mentioned metal ion equivalents, optionally present acid protective groups are cleaved off, the desired metal ions are introduced and then, if desired, existing acid hydrogen atoms are substituted by cations of inorganic and/or organic bases, amino acids or amino acid amides.

10. A polyrotoxane according to claim 1, which consists of the 6, 6′, 6″, 6‴, 6⁗, 6⁗′-hexa-gadolinium-GlyMeDOTA ester of α-cyclodextrin and the PEG-bisamide derivative of O,O′-bis(aminoethyl)-PEG and gadolinium-GlyMeDOTA acid.

* * * * *